(12) United States Patent
Vinciarelli

(10) Patent No.: US 9,087,656 B1
(45) Date of Patent: **\*Jul. 21, 2015**

(54) POWER SUPPLY SYSTEM WITH POWER FACTOR CORRECTION AND EFFICIENT LOW POWER OPERATION

(75) Inventor: Patrizio Vinciarelli, Boston, MA (US)

(73) Assignee: VI Chip, Inc., Andover, MA (US)

( * ) Notice: Subject to any disclaimer, the term of this patent is extended or adjusted under 35 U.S.C. 154(b) by 518 days.

This patent is subject to a terminal disclaimer.

(21) Appl. No.: 13/526,165

(22) Filed: Jun. 18, 2012

Related U.S. Application Data

(63) Continuation-in-part of application No. 12/701,983, filed on Feb. 8, 2010, now Pat. No. 8,222,772.

(51) Int. Cl.
   *H01H 9/54* (2006.01)
(52) U.S. Cl.
   CPC .................................... *H01H 9/54* (2013.01)
(58) Field of Classification Search
   USPC .......................................................... 307/140
   See application file for complete search history.

(56) References Cited

U.S. PATENT DOCUMENTS

| | | | |
|---|---|---|---|
| 4,937,728 A | 6/1990 | Leonardi | |
| 6,434,030 B1 | 8/2002 | Rehm et al. | |
| 7,561,446 B1 | 7/2009 | Vinciarelli | |
| 8,222,772 B1 * | 7/2012 | Vinciarelli | 307/140 |
| 2008/0117656 A1 | 5/2008 | Clarkin | |

OTHER PUBLICATIONS

TEA1750 GreenChip III SMPS Control IC, Rev. 1-6, Apr. 2007, published by NXP Semiconductor, Eindhoven, the Netherlands, 29 pages.

* cited by examiner

*Primary Examiner* — Robert Deberadinis
(74) *Attorney, Agent, or Firm* — Fish & Richardson P.C.

(57) ABSTRACT

A method and apparatus for efficiently converting power from an AC line is disclosed. The power converter supplies power to the load, performing power factor correction at nominal and high loads, i.e. above a predetermined output power threshold, and operating in an on-demand burst mode synchronized to the AC line at low loads, i.e. below a predetermined output power threshold. The duration of an operating interval during which power conversion takes place may be reduced and varied at low loads as a function of the output power demands to increase overall conversion efficiency. The operating interval may be centered about a peak in the input voltage waveshape for operating intervals that are less than a full rectification period. For operating intervals that are less than a full rectification period a modified power factor correction may be used, in which the input current waveshape approximates the input voltage waveshape during the operating interval.

41 Claims, 19 Drawing Sheets

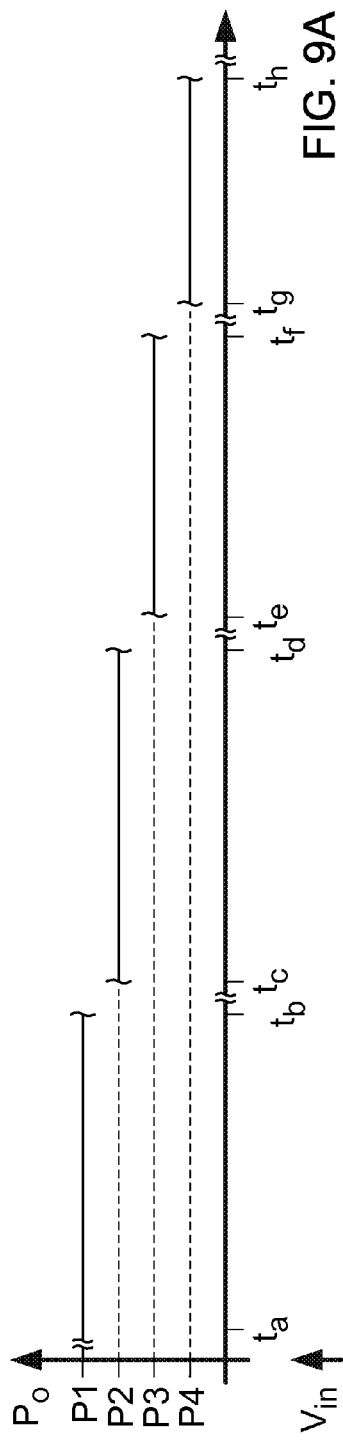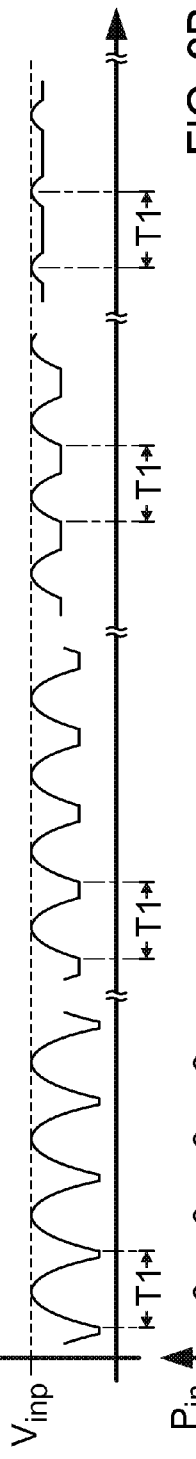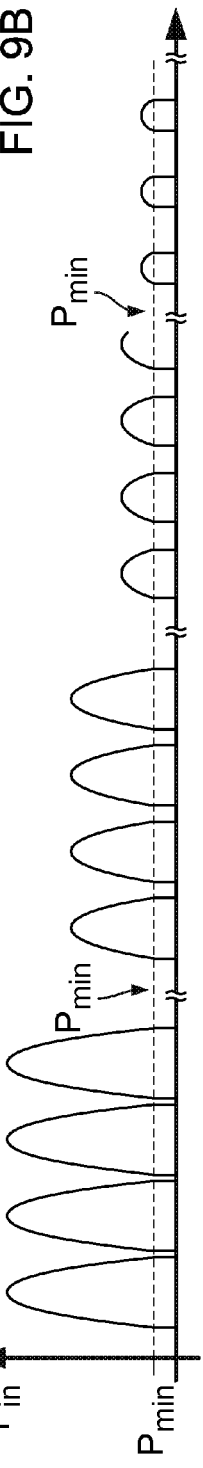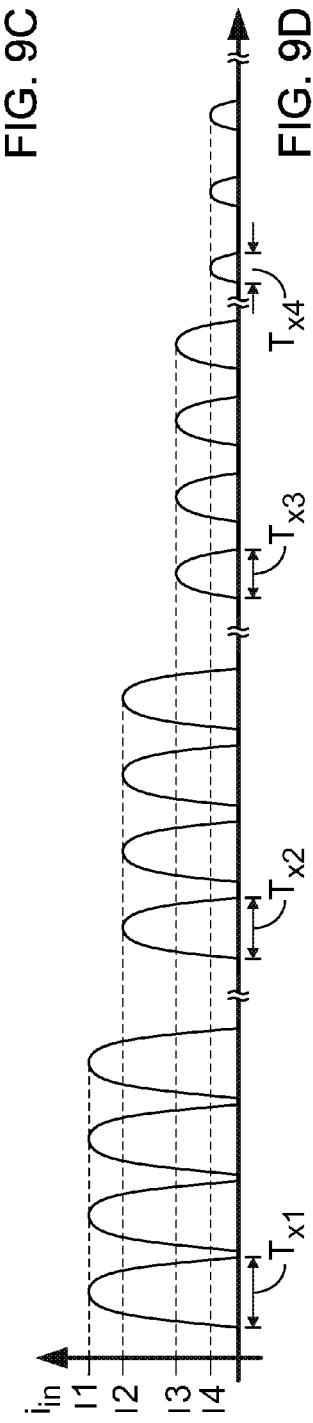

POWER SUPPLY SYSTEM WITH POWER FACTOR CORRECTION AND EFFICIENT LOW POWER OPERATION

CROSS-REFERENCE TO RELATED APPLICATION

This application is a continuation-in-part of and claims priority from U.S. application Ser. No. 12/701,983, filed on Feb. 8, 2010 now U.S. Pat. No. 8,222,772, incorporated herein by reference in its entirety.

FIELD OF THE INVENTION

This invention relates to switching power supplies. More particularly, this invention relates to switching power supplies that operate efficiently at operating power levels that are relatively small compared to their full rated operating power levels.

BACKGROUND

Switching power supplies may be called upon to supply power to a load over a wide range: relatively large amounts of power may be required by a load in a "normal" operating mode, whereas relatively very little power may be required by the load during a "standby" operating mode. For example, an LCD flat-panel television receiver may require 350 Watts of operating power in normal operation but may only draw a small amount of power (e.g., less than 1 Watt) in a standby mode (i.e., when it is "turned off") in order, e.g., to keep remote-control circuitry active.

Power supplies that operate from AC utility lines ("off-line power supplies") may be called upon to meet special regulatory and performance requirements. For example, if the power drawn by a device from the AC utility line exceeds a certain limit (e.g., 75 Watts), it may be a requirement that the power supply in the device operate in a power-factor-correcting mode; on the other hand, it may also be a requirement that the power supply draw less than a specified amount of power (e.g., less than 1 Watt) from the utility lines when the device is in a standby mode of operation, in order to minimize energy utilization.

Off-line switching power supplies with power factor correction are well known in the art. Such supplies typically comprise a rectifier, to convert the AC utility line voltage into a unipolar pulsating input voltage, and a DC-DC converter that comprises one or more switches that are controlled by a controller. The controller controls the switches, at a switching frequency that may be much higher than the frequency of the AC utility source, to convert the unipolar pulsating input voltage into one or more controlled DC voltage outputs while also performing power factor correction (e.g., by forcing the waveshape of the current drawn from the AC utility source to follow the waveshape of the voltage delivered by the AC utility source). In normal operation, when supplying relatively high levels of power, the relatively high frequency switching may take place essentially continuously and the power supply may exhibit relatively high conversion efficiency. Continuous operation at relatively low load power levels, however, may present difficulties: e.g., it may be difficult to achieve switch duty cycles that are sufficiently low to maintain voltages within regulation; high frequency switching losses in continuous operation may result in objectionable losses. Lowering the switching frequency may produce audible noise.

One way to modify operation of an off-line, power-factor-corrected, isolated, switching power supply, at low power, is described in a datasheet for a power supply controller entitled *TEA1750 GreenChip III SMPS control IC*, Rev. 1-6 Apr. 2007, published by NXP Semiconductor, Eindhoven, the Netherlands. The NXP controller operates in a first operating mode, in which power-factor-correction and output control are performed at a continuous high switching frequency, when the power delivered by the power supply is high; the controller operates the power supply in another operating mode, called a "burst mode," when the power delivered by the power supply is low. In burst mode, the power supply alternates between periods during which high-frequency switching occurs and periods during which no switching occurs. The NXP controller varies the frequency of the bursts as a function of the load power and a value of a circuit capacitor; audible noise may be reduced by initiating a "soft-start" mode during each burst. Another version of standby mode control is described in Rehm et al, U.S. Pat. No. 6,434,030, Arrangement Having a Switched-Mode Power Supply and a Microprocessor, issued Aug. 13, 2002. In Rehm, an off-line, isolated, flyback switching power supply is controlled to operate at low power in a burst mode at a pre-defined burst repetition frequency (e.g., 100 Hz) that is programmed into and controlled by a microprocessor. Yet another technique is described in Leonardi, U.S. Pat. No. 4,937,728, Switch-Mode Power Supply with Burst Mode Standby Operation, issued Jun. 26, 1990. In Leonardi, a burst mode in an off-line, isolated, flyback switching power supply is synchronized to the frequency of the utility line, the length of the each burst being essentially fixed to correspond to one-quarter of each AC utility line cycle.

Cascading a module comprising a rectifier and a DC transformer and a module comprising a buck-boost converter to provide voltage transformation, regulation and power factor correction is described in Vinciarelli, U.S. Pat. No. 7,940,540, Universal AC Adaptor, issued May 10, 2011 (assigned to the same assignee as this application and incorporated by reference in its entirety).

SUMMARY

In one aspect, in general, an apparatus may include a unipolar input for receiving a pulsating unipolar input voltage characterized by a series of unipolar pulses, the pulses being characterized by a pulse waveform, a pulse duration, and a characteristic frequency. The apparatus may include a first DC-DC switching power converter for converting power received from the unipolar input for delivery to a first load via a first output at a first DC output voltage, the first DC-DC switching power converter including one or more switches. The apparatus may include a controller for operating the one or more switches in a series of converter operating cycles, to control the first DC output voltage to be substantially equal to a pre-determined value over a range of power levels delivered by the converter. The converter operating cycles may include a duration defining a converter operating period, and the converter operating period may be 1% or less of the pulse duration. The first power converter may be adapted to convert power via the first output for delivery to the first load during an operating interval, the operating interval including a selected portion of the pulse duration, and to refrain from converting power via the first output for delivery to the first load during the remainder of the pulse duration; and to vary the duration of the operating interval as a function of the magnitude of the power converted by the first DC-DC switching power converter.

Implementations of the apparatus may include one or more of the following features. The first DC-DC switching power converter may be a flyback converter. The first load may include a second DC-DC converter that delivers power to first load circuitry. The apparatus may include an AC input for receiving power from an AC source and a rectifier having an input connected to the AC input and an output connected to the unipolar input. The rectifier may provide full-wave rectification, the AC source can have a frequency that is one half of the characteristic frequency of the unipolar input voltage and have a period that is approximately twice the pulse duration. The apparatus may include an input capacitance connected across the unipolar input. The controller may adjust the phase angle of the operating interval relative to the unipolar input towards centering the operating interval about a peak in the pulse waveform. A current operating interval may be terminated at a time, $t_{dis}$, when instantaneous power being delivered by the converter falls below a pre-determined value, $P_{min}$; and a successive operating interval can begin at a time following $t_{dis}$, when the instantaneous unipolar input voltage is increasing and becomes greater than a predetermined threshold voltage, $V_{th}$. The predetermined threshold voltage, $V_{th}$, may be set to a value corresponding to the instantaneous unipolar input voltage at the time, $t_{dis}$, that the current operating interval is closed.

The first DC-DC switching power converter may include a double-clamped buck-boost converter. The switch controller may adjust the envelope of current drawn during the operating interval by the first DC-DC power converter from the unipolar input to approximate the pulse waveform during the operating interval. The switch controller may adjust the envelope of current drawn during the operating interval by the first DC-DC power converter from the unipolar input to approximate the pulse waveform during the operating interval when the power delivered by the converter is greater than a pre-determined value. The first power converter may include a second output for delivering power to a second load and wherein the first power converter may be adapted to convert power via the second output for delivery to the second load during the operating interval. In some examples, the first power converter may be adapted to refrain from converting power via the second output for delivery to the second load at times outside of the operating interval. In some examples, the first power converter may be adapted to convert power via the second output for delivery to the second load at times outside of the operating interval.

The switch controller may adjust the envelope of current drawn during the operating interval by the first DC-DC power converter from the unipolar input to approximate the pulse waveform during the operating interval. The controller may be configured to control the amount of energy delivered during each converter operating cycle to vary as a function of the square of an error signal. The apparatus may include an integrating amplifier configured to compare a signal indicative of the first output voltage to a signal indicative of a desired value for the first output voltage, and produce an integrated error signal; a normalizer configured to produce an envelope signal representing a desired value for the current drawn from the unipolar input; and a multiplier configured to provide the error signal representative of the product of the integrated error signal and the envelope signal. The first DC-DC switching power converter may include a double-clamped buck-boost converter and the controller may be configured to control the duration of an energy storage phase within a converter operating cycle to increase in proportion to an increase in the error signal. The envelope signal may include variations synchronized to the unipolar input voltage and approximating the pulse waveform. The apparatus may include an AC input for receiving power from an AC source and a rectifier having an input connected to the AC input and an output connected to the unipolar input and wherein the envelope signal may include variations synchronized to the AC source and approximating a waveform of the absolute value of the AC source. The controller may adjust the phase angle of the operating interval relative to the unipolar input towards centering the operating interval about a peak in the pulse waveform. The apparatus may include a power sense circuit for delivering a signal indicative of the instantaneous power processed by the first DC-DC switching power converter. A current operating interval may be closed at a time, $t_{dis}$, when instantaneous power being delivered by the converter falls below a pre-determined value, $P_{min}$; and a successive operating interval may be opened at a time following $t_{dis}$, when the instantaneous unipolar input voltage is increasing and becomes greater than a predetermined threshold voltage, $V_{th}$. The predetermined threshold voltage, $V_{th}$, may be set to a value corresponding to the instantaneous unipolar input voltage at the time, $t_{dis}$, that the current operating interval is closed.

The switch controller may adjust the envelope of current drawn during the operating interval by the first DC-DC power converter from the unipolar input to approximate the pulse waveform during the operating interval when the power delivered by the converter is greater than a pre-determined value. The controller may refrain from adjusting the envelope of the input current during the operating interval when the power delivered by the converter is less than a pre-determined value. The controller may be configured to increase the duration of the operating interval as the power delivered by the first DC-DC converter increases. The controller may be configured to set the duration of the operating interval to a pre-determined maximum whenever the magnitude of the power converted by the first DC-DC switching power is above a pre-determined value. The predetermined maximum may include 98% or more of the pulse duration. The predetermined maximum may include the rectification period. The first power converter may include a second output for delivering power to a second load and wherein the first power converter may be adapted to convert power via the second output for delivery to the second load during the operating interval. In some examples, the first power converter may be adapted to refrain from converting power via the second output for delivery to the second load at times outside of the operating interval. In some examples, the first power converter may be adapted to convert power via the second output for delivery to the second load at times outside of the operating interval.

In another aspect, in general, a method includes receiving at an input, a pulsating unipolar input voltage characterized by a series of unipolar pulses, the pulses being characterized by a pulse voltage-waveform, a pulse duration, and a characteristic frequency. The method includes converting, in a first DC to DC power conversion stage, power received from the pulsating unipolar input in a series of converter operating cycles, each having a duration that is 1% or less of the pulse duration, for delivery to a first load connected to a first output at a first DC output voltage. The method includes controlling the first DC output voltage to be substantially equal to a pre-determined value over a range of power levels delivered by the first power conversion stage, enabling the converting via the first output for delivery to the first load during an operating interval including a selected portion of the pulse duration, disabling the converting via the first output for delivery to the first load during the remainder of the pulse duration, varying the duration of the operating interval as a function of the magnitude of the power converted by the first DC-DC power conversion stage, and adjusting an envelope of current drawn during the operating interval by the first DC-DC power conversion stage from the input to approximate the pulse voltage waveform during the operating interval for predetermined operating criteria.

Implementations of the method may include one or more of the following features. In some examples, the predetermined operating criteria may include all power levels in the range of power levels delivered by the first power conversion stage. In some examples, the predetermined operating criteria may include power levels within the range exceeding a predetermined threshold. The method may include essentially fixing the duration of the operating interval at a predetermined maximum duration for power levels within the first portion of the range. In some examples, the predetermined maximum duration may be set essentially equal to a rectification period. In some examples, the predetermined maximum duration may be less than the rectification period. The controller may vary the duration of the operating interval when the power delivered to the output is within a second portion of the range of power levels. The second portion of the range may include power levels within the range below a predetermined threshold.

The method may include reducing the duration of the operating interval as the power delivered to the output is reduced within the second portion of the range. The method may include providing galvanic isolation between the input and the first output. The method may include adjusting the phase angle of the operating interval relative to the unipolar input towards centering the operating interval about a peak in the pulse waveform. The method may include terminating a current operating interval at a time, $t_{dis}$, when instantaneous power being delivered by the converter falls below a predetermined value, $P_{min}$; and starting a successive operating interval at a time following $t_{dis}$, when the instantaneous unipolar input voltage is increasing and becomes greater than a predetermined threshold voltage, $V_{th}$. The method may include setting the predetermined threshold voltage, $V_{th}$, to a value corresponding to the instantaneous unipolar input voltage at the time, $t_{dis}$, that the current operating interval is closed. The method may include inhibiting operating intervals during selected ones of the unipolar pulses in the series of unipolar pulses. The selected ones of the unipolar pulses may be separated by at least one unipolar pulse. The method may include receiving power from an AC source, rectifying the received power, and supplying the rectified power to the input. The method may include storing energy received from the output. The method may include converting power received from the output for delivery of a second DC output voltage to a regulator output, wherein the first DC output voltage is greater than the second DC output voltage. The method may include providing a plurality of second DC output voltages to a plurality of regulator outputs.

In another aspect, in general, a method is provided for controlling the duration of an operating interval in a switching power converter of the kind that receives power from a pulsating input source, each of the pulses occurring within a characteristic period defined by a characteristic frequency of an input source, and delivers power to a first output during the operating interval, the operating interval including a selected portion of a characteristic period, and refrains from delivering power to the first output during the remainder of the characteristic period. The method includes disabling power delivery from the converter at a time, tdis, when power delivery from the converter is enabled and the instantaneous power being delivered to the converter input falls below a pre-determined value, Pmin. The method includes enabling power delivery from the converter, at a time following tdis, when power delivery from the converter is disabled, the converter input voltage is increasing, and the converter input voltage becomes greater than the value that it was at time tdis.

Implementations of the method may include one or more of the following features. The method may include determining and storing a value Vx, indicative of the value of the converter input voltage at time tdis, and determining, at a time following tdis and when the converter input voltage is increasing, when the converter input voltage becomes greater than the value indicated by Vx.

In another aspect, in general, an apparatus may include a unipolar input for receiving a pulsating unipolar input voltage characterized by a series of unipolar pulses at a characteristic frequency. Each unipolar pulse may be characterized by a pulse waveform and a pulse duration. A first switching power converter may convert power received from the unipolar input for delivery to a first output. The first switching power converter may have one or more switches, and a controller for operating the one or more switches in a series of converter operating cycles. The converter operating cycles may have a duration defining a converter operating period and the converter operating period may be 1% or less of the pulse duration. The first power converter may convert power for delivery to the first output during an operating interval, which may be a selected portion of the pulse duration, and to refrain from delivering power to the first output during the remainder of the pulse duration. The waveform of the voltage delivered by the first power converter to the first output during the operating interval may be substantially the same as the waveform of the pulsating input voltage during the operating interval. The first power converter may vary the duration of the operating interval as a function of the magnitude of the power converted by the first switching power converter.

Implementations of the apparatus may include one or more of the following features. The first power converter may include a transformer and provide galvanic isolation between the unipolar input and the first output. The first power converter may deliver an output voltage to the first output that is a fixed fraction of the voltage received at the unipolar input. The first switching power converter may terminate a present operating interval when a representation of the power being processed by the first switching power converter satisfies a predetermined condition. The first switching power converter may initiate a new operating interval when the input voltage rises to a level representative of the voltage at which the previous operating interval was terminated. A distribution bus may be connected to receive and transmit power from the first output. One or more second power conversion stages may be connected to receive power from the first output via the distribution bus and deliver a respective controlled output to a respective load. The second power conversion stages may convert power from the distribution bus essentially during the operating interval and to essentially refrain from converting power from the distribution at other times. A plurality of second power conversion stages may be used. The second power conversion stages may sense the beginning and end of each operating interval. A rectifier circuit may have a rectifier input for receiving AC power and a rectifier output for delivering a unipolar voltage to the unipolar input. The first switching power converter may switch the fixed fraction between a first value for a first predetermined input voltage range and a second value for a second predetermined input voltage range.

In another aspect, in general, an apparatus may include an input port for receiving power from a unipolar pulsed power source which delivers power in a series of pulses which occur a maximum repetition rate, the maximum repetition rate defining a minimum repetition period and the duration of each pulse defining an operating interval during which the unipolar pulsed power source is adapted to deliver power to the input port and outside of which the unipolar pulsed power source is adapted to refrain from delivering power to the input port. A switching power converter may have one or more switches and a controller for operating the one or more switches in a series of converter operating cycles, the duration of which defines a converter operating period that is 1% or less of the minimum repetition period. The switching power converter may convert power received from the input port for delivery to a load via an output during the operating interval and essentially refrain from converting power during other times.

Implementations of the apparatus may include one or more of the following features. The power converter may convert power for delivery to the load for a period shorter than the operating interval. The power converter may deliver a controlled output to the load. The power converter may adjust an envelope of current drawn during the operating interval by the power converter from the unipolar input to approximate a waveform of pulse voltage during the operating interval. The envelope of current and the waveform of pulse voltage may be substantially sinusoidal during the operating interval. The power converter may stop converting power in response to a predetermined voltage change at the unipolar input indicating the end of an operating interval. The power converter may start converting power in response to a predetermined voltage change at the unipolar input indicating the beginning of an operating interval. The power converter may start converting power when a voltage the unipolar input is rising and reaches a threshold determined by the end of a previous operating interval.

In another aspect, in general, an apparatus may include a unipolar input for receiving a pulsating unipolar input voltage characterized by a series of unipolar pulses at a characteristic frequency, each unipolar pulse being characterized by a pulse waveform and a pulse duration. A first switching power converter may convert power received from the unipolar input for delivery to a power distribution bus. The first switching power converter may have one or more switches and a first controller for operating the one or more switches in a series of converter operating cycles. Each converter operating cycle may be characterized by a first converter operating period, the duration of which may be 1% or less of the pulse duration. The first power converter may convert power for delivery to the power distribution bus during an operating interval, which may comprise a selected portion of the pulse duration, and refrain from delivering power to the power distribution bus during the remainder of the pulse duration. The waveform of the voltage delivered by the first power converter to the distribution bus during the operating interval may be substantially the same as the waveform of the pulsating input voltage during the operating interval. The controller may control the duration of the operating interval as a function of the magnitude of the power converted by the first switching power converter. One or more second switching power conversion stages may each have an input port connected to receive power from the power distribution bus, one or more switches, and a respective controller to operate the one or more switches in a series of converter operating cycles. Each converter operating cycle may be characterized by a converter operating period, the duration of which is 1% or less of the pulse duration. The second switching power conversion stages may convert power received from the input port for delivery to a respective load via a respective output at a respective output voltage during the operating interval and essentially refrain from converting power during other times.

Implementations of the apparatus may include one or more of the following features. The second power conversion stages may adjust an envelope of current drawn during the operating interval from the input port to approximate the pulse waveform during the operating interval. The envelope of current and the pulse waveform may be substantially sinusoidal. A plurality of second power conversion stages may be used. The first switching power converter may control the position of the start and end times of the operating interval relative to the start and end times of the pulse waveform. The second power conversion stages may sense the end of each operating interval by sensing and storing a magnitude, $V_x$, of the voltage across the power distribution bus at the end of each operating interval, and sense the beginning of each operating interval by sensing when the voltage across the power distribution bus is increasing and passes above the voltage $V_x$. The second power conversion stages may stop converting power in response to a predetermined voltage change at the input port indicating the end of an operating interval. The second power conversion stages may start converting power in response to a predetermined voltage change at the input port indicating the beginning of an operating interval. The second power conversion stages may start converting power when a voltage at the input port is rising and reaches a threshold determined by the end of a previous operating interval. The first power converter may include a transformer and provide galvanic isolation between the unipolar input and the power distribution bus. The first power converter may deliver an output voltage to the power distribution bus that is a fixed fraction of the voltage received at the unipolar input. The first switching power converter may terminate a present operating interval when a representation of the power being processed by the first switching power converter satisfies a predetermined condition. The first switching power converter may initiate a new operating interval when the input voltage rises to a level representative of the voltage at which the previous operating interval was terminated.

The details of one or more embodiments of the invention are set forth in the accompanying drawings and description below. Other features, objects, and advantages of the invention will be apparent from the description and drawings, and from the claims.

DESCRIPTION OF DRAWINGS

FIGS. 9A-9D show waveforms for the power supply system of FIGS. 6 and 7 at different operating power levels.

Like references symbols in the various drawings indicate like elements.

DETAILED DESCRIPTION

Figure 1:
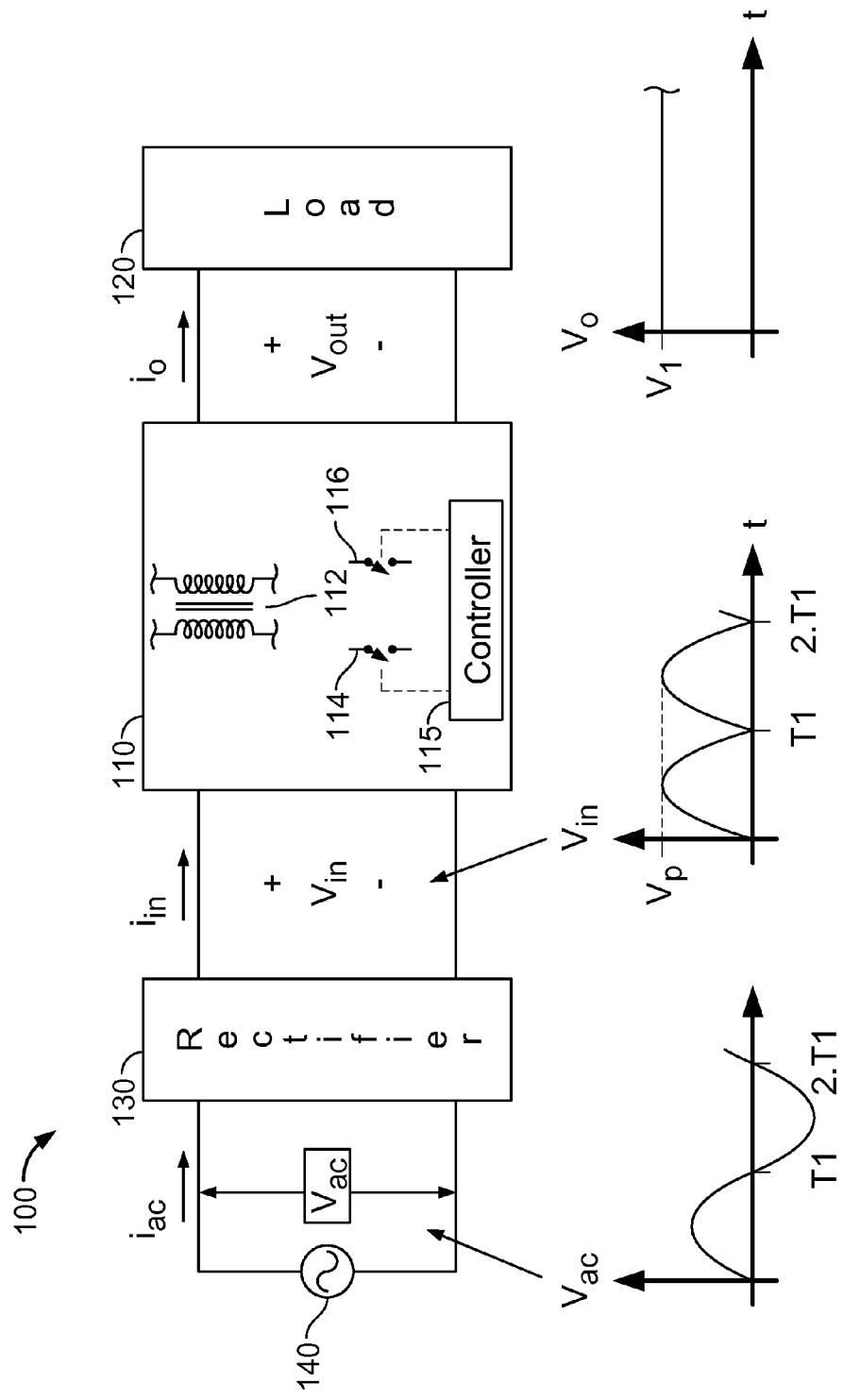
FIG. 1 shows a block diagram of an off-line switching power supply system.

FIG. 1 shows a block diagram of a switching power supply system 100. The system comprises a switching power converter 110 that accepts a unipolar input voltage, $V_{in}$, at its input and delivers a DC output voltage, $V_{out}$, to a load 120 connected to its output. In FIG. 1, the voltage $V_{in}$ is shown to be a unipolar time-varying input voltage that is derived by rectifying (by means of rectifier 130) an AC input source 140. As shown in FIG. 1, the unipolar time-varying input voltage, $V_{in}$, has a characteristic frequency, $f_c=1/T1$ (where T1 is the characteristic period of the input voltage $V_{in}$), that is directly related to the frequency of the AC input source 140, $f_{ac}$ ($f_c=2f_{ac}$).

The switching power converter 110 is shown to comprise one or more switches, e.g. switches 114, 116, and a controller 115. The controller 115 operates the one or more switches at a converter operating frequency, $f_o$, that is much greater than the characteristic frequency, $f_c$, of the unipolar time-varying input voltage $V_{in}$ to transfer energy from the converter input to the load and to control the output voltage, $V_{out}$, as power delivered to the load varies over a range of power levels. The controller may also perform power factor correction ("PFC") by also controlling the switches to force the low-frequency envelope of high-frequency current pulses, i.e. the line-frequency of the current, $I_{ac}$, drawn from the AC utility source, to follow the waveshape of the voltage, $V_{ac}$, delivered by the AC utility source. With PFC, the output voltage V1 of converter 110 would likely include some ripple (not shown) as a result of the PFC.

The switching power converter 110 may be non-isolated, or it may be isolated (as indicated by the transformer 112, FIG. 1) to provide galvanic isolation between $V_{in}$ and $V_{out}$, and may be any one of a wide variety of switching power converter topologies: e.g., boost or flyback. In a preferred embodiment the power converter 110 may comprise a double-clamped ZVS buck-boost power converter, e.g. as described in Vinciarelli, Double-Clamped ZVS Buck-Boost Power Converter, U.S. Pat. No. 7,561,446, issued Jul. 14, 2009 and incorporated herein in its entirety by reference (the "Double-Clamped Patent").

Figure 2:
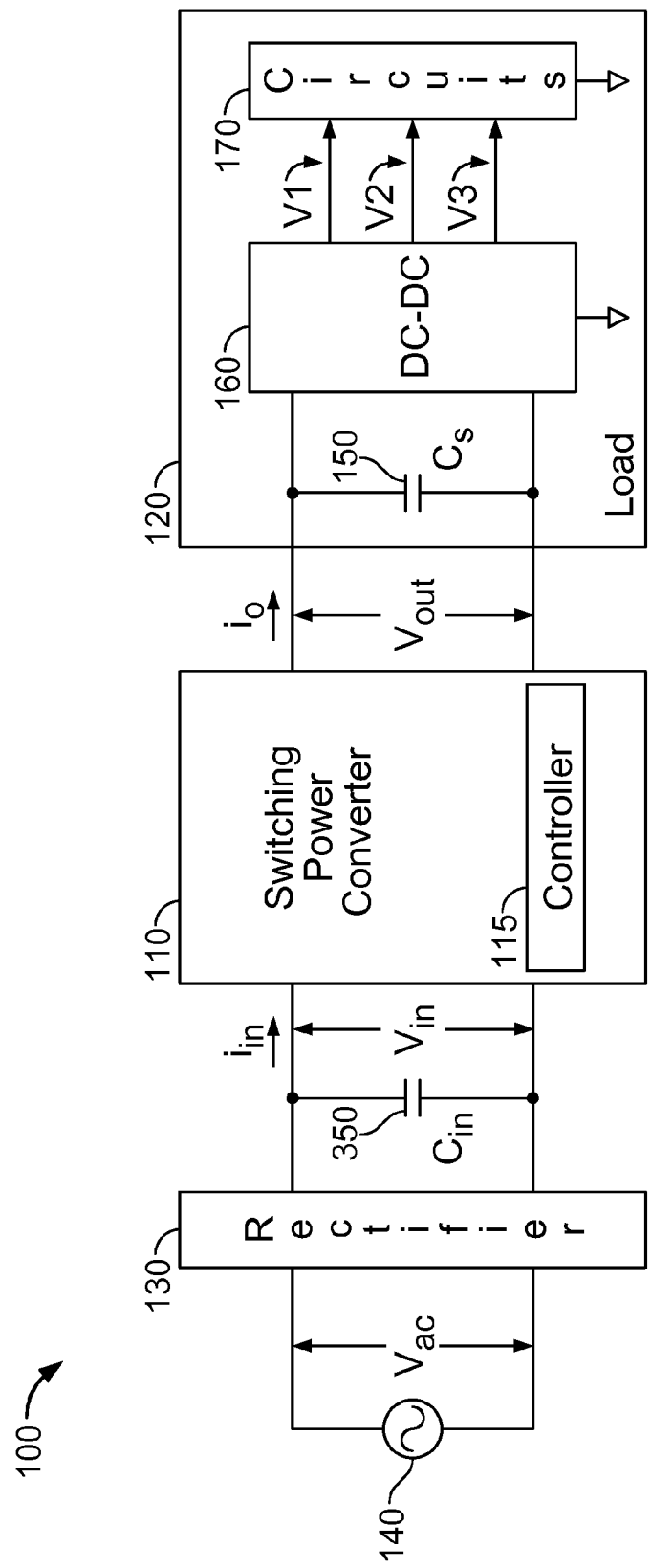
FIG. 2 shows another block diagram of an off-line switching power supply system.
Figure 3A:
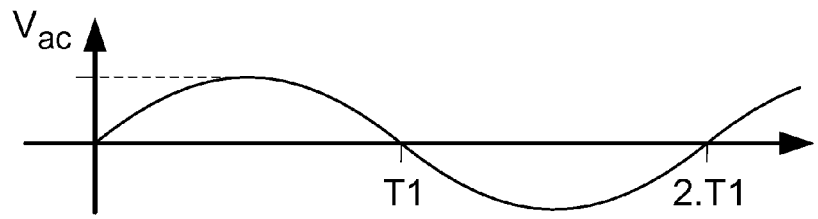
FIGS. 3A-3D show waveforms in the power supply system of FIG. 2.
Figure 3B:
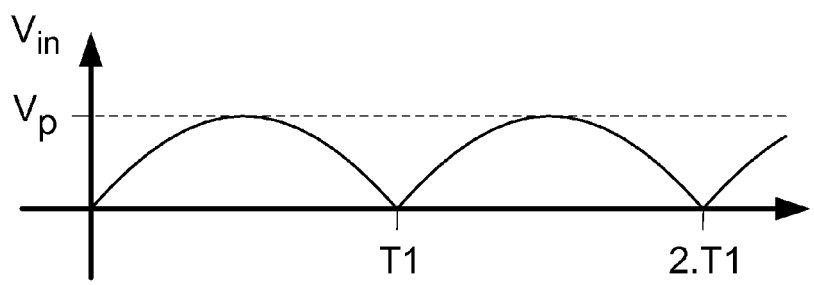
Figure 8A:
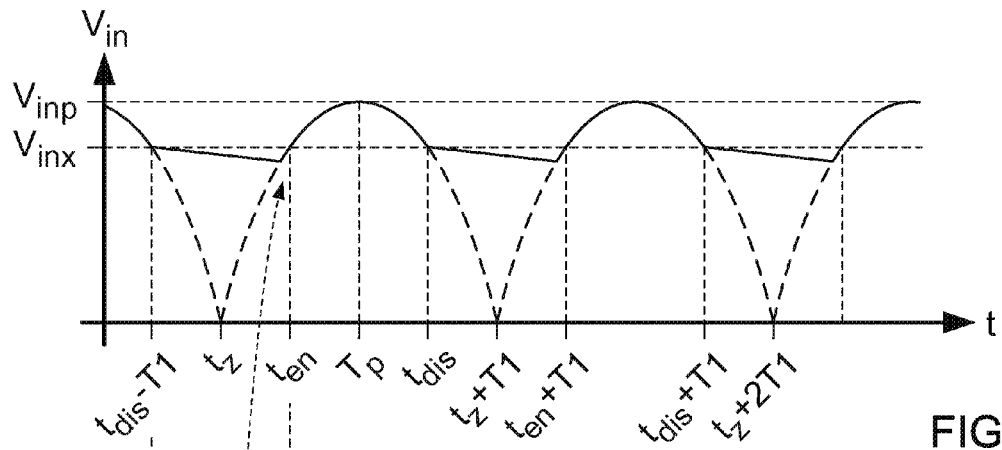
FIGS. 8A-8D show waveforms for the power supply system of FIGS. 6 and 7.
Figure 8B:
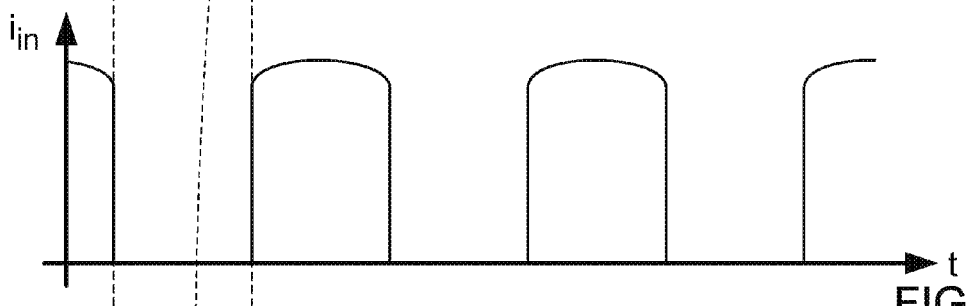
Figure 8C:
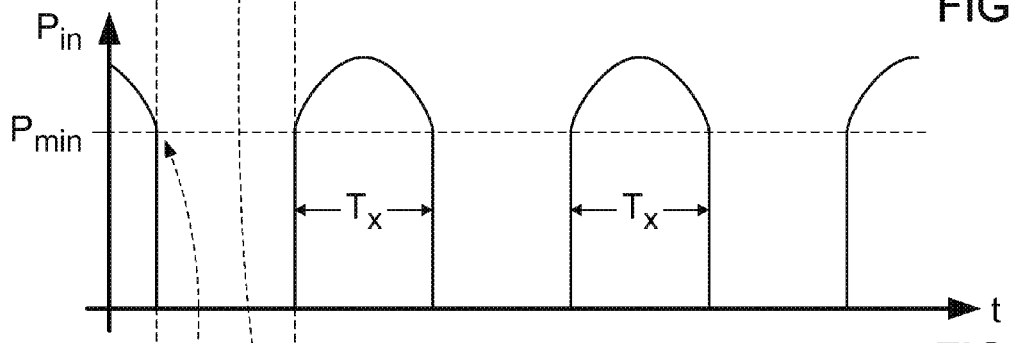
Figure 8D:
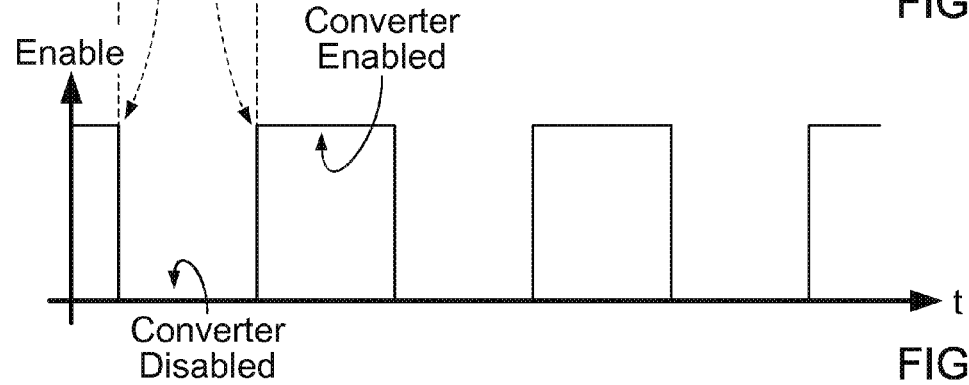

FIG. 2 shows an example of a power supply system 100 of the kind shown in FIG. 1. In FIG. 2 the load 120 comprises a capacitor 150 and a DC-DC converter 160. The DC-DC converter 160 is cascaded relative to the switching power converter 110 (i.e., the DC-DC converter 160 receives its input power from the output of the switching power converter 110). Capacitor 150 represents all of the capacitance at the output of converter 110, including output filter capacitance that may be included in power converter 110 and input capacitance that may be included in load 120. Input capacitor 350 may represent all of the capacitance at the input of the converter 110, and may include capacitance associated with input EMI filter circuitry (not shown) and discrete capacitance for controlling the impedance at the input of the converter 110. The DC-DC converter 160 may as shown supply one or more output voltages (e.g., voltages V1, V2, V3, FIG. 2) to circuitry 170. The output voltage, $V_{out}$, of converter 110 may preferably be greater than one or more of the output voltages V1, V2, V3 of converter 160. The circuitry 170 may, for example, comprise the electronic and display components of an LCD flat-panel television set. Waveforms for the system 100 of FIG. 2, at a relatively high load power, are shown in FIGS. 3A to 3D. FIGS. 3A and 3B show, respectively, the AC input source voltage, $V_{ac}$, and the rectified unipolar time-varying input voltage, $V_{in}$, delivered by the rectifier 130 to the input of the switching power converter 110. The waveform of the input voltage $V_{in}$ may be affected by the presence of input capacitance and the operation of the converter 110, as shown in FIGS. 8A and 9B and discussed in more detail below.

Figure 3C:
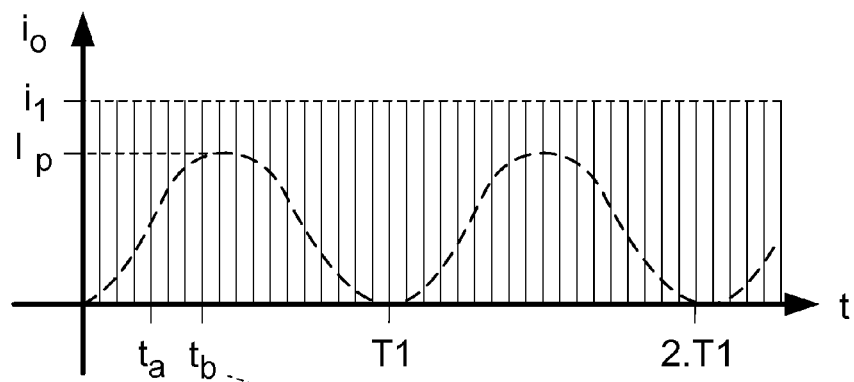
Figure 3D:
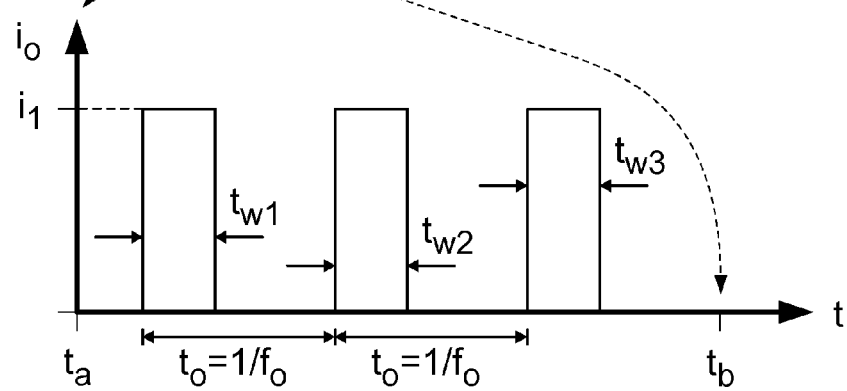

Referring to FIG. 3C, the converter output current $i_o$ may be delivered as a series of high-frequency (relative to $f_{ac}$) current pulses (shown as vertical lines in FIG. 3C). Each current pulse may occur within a respective one of a series of converter operating cycles, for example, as described in the Double-Clamped Patent. The duration $t_O$ (FIG. 3D) of the converter operating cycle may be referred to as the converter operating period. FIG. 3D is a temporally magnified view of a portion of the waveform of FIG. 3C, showing that the operating cycles and pulses of current may occur at an essentially fixed converter operating frequency, $fo=1/t_O$, that is much higher than the characteristic frequency, $1/T1$, of the unipolar time-varying input voltage $V_{in}$. In some implementations, the converter operating period preferably may be set to 1% or less of the characteristic period T1 of the input voltage $V_{in}$. As also illustrated in FIG. 3D, the duty cycle, $D=t_w/t_o$, of the current pulses (where $t_w$ is the width of a current pulse within each operating cycle of duration $t_o$) may be varied as a means of varying the average value of the current $i_o$ (e.g., as indicated in FIG. 3D by the variation in the widths tw1, tw2, tw3). Capacitor 150 may smooth the pulsating output of the converter 110 providing the filtered DC voltage, $V_{out}$. Capacitor 150 may also provide intermediate energy storage to support operation of the load 120, e.g. during momentary AC utility source outages.

Depending upon the specific power conversion topology used, controller 115 may vary one or more of (a) the duty cycle, i.e. pulse width tw1 (FIG. 3D), (b) the converter operating frequency, $f_o=1/t_o$ (FIG. 3D), and (c) the amplitude of the pulses of current, $i_1$, delivered by the converter 110 (FIG. 3D), as a means of controlling the output voltage, $V_{out}$, and for forcing the low-frequency envelope of the input current to match the waveshape of the input voltage such as during power factor correction operation. The dashed sinusoidal waveform shown in FIG. 3C represents the envelope of the current, $i_o$, i.e. the value of $i_o$ averaged over time periods that are relatively long compared to $t_o$ but relatively short compared to T1. The current envelope (dashed sinusoidal waveform) may be representative of the current $i_o$ delivered by a power factor corrected converter 110 when the converter is connected to a sinusoidal AC line voltage source 140 via a full-wave rectifier 130 and is accordingly shown having a period T1. The amplitude of the envelope of the converter output current decreases (resulting in a decrease in the peak current amplitude, Ip, FIG. 3C) as the load power decreases.

As the load power decreases, the duty cycle or operating frequency of the converter 110, or both may also decrease. As noted earlier, practical limitations on duty cycle control may result in reduced converter operating efficiency and difficulty in maintaining regulation. One conventional way to circumvent such difficulties is to reduce the converter operating frequency. However, reducing the converter operating frequency may produce audible noise. Another conventional method changes between different operating modes, i.e. invoke a different operating mode when the power delivered by the converter reaches a relatively low level.

Figure 4:
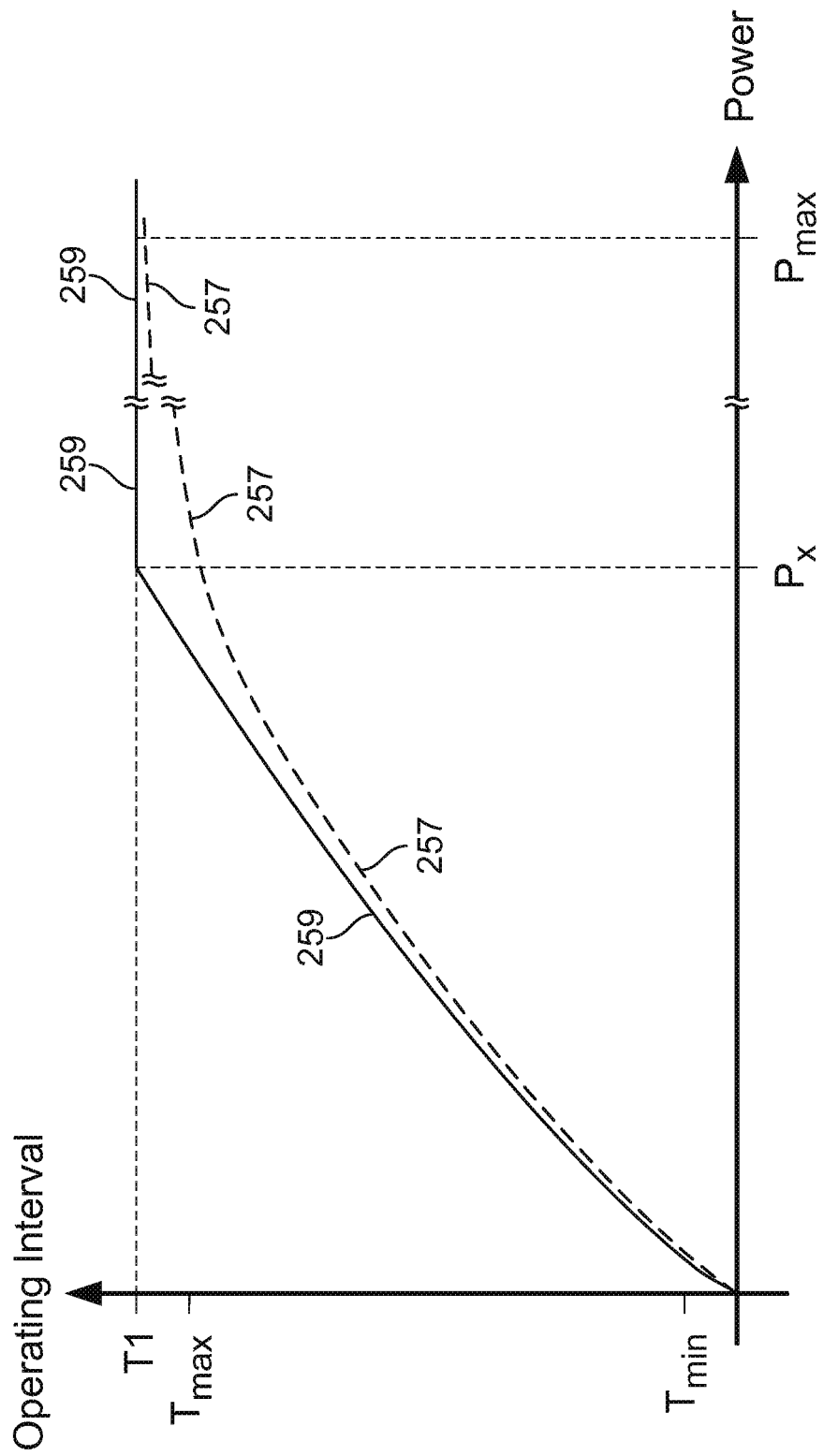
FIG. 4 shows a transfer function relating an operating interval to delivered power.
Figure 5:
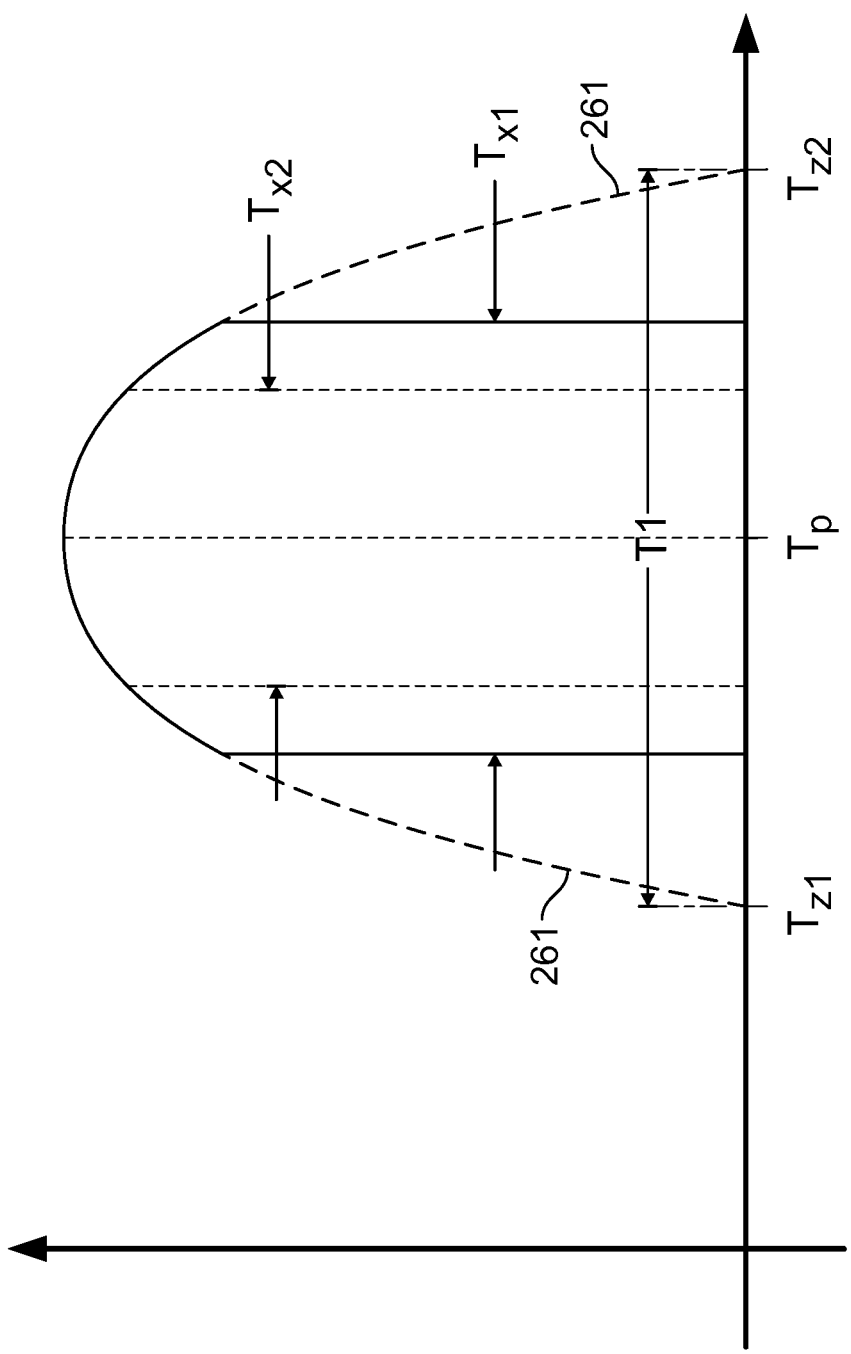
FIG. 5 shows a waveform illustrating input current envelope and operating interval timing relative to input voltage waveform.

As shown in FIGS. 4 and 5, the power supply system 100 of FIG. 2 may be operated in a single mode continuously variable from full PFC mode to standby mode avoiding invocation of different operating modes for "normal" (i.e., relatively high power) and "standby" (i.e., relatively low power) operation. The converter may be operated in a series of "operating intervals" each of which may be matched to a respective cycle of the characteristic frequency, i.e. a respective unipolar pulse, 0-T1, T1-T2, T2-T3, etc. of the time-varying converter input voltage, $V_{in}$. The length of each operating interval may be selectively varied by the controller 115 as a function of the power being delivered by the switching power converter 110 between a predetermined minimum duration, e.g. 0, and a predetermined maximum duration, e.g. T1.

FIG. 4 shows a conceptual transfer function of operating interval duration as a function of power illustrating continuously variable operation of the converter between full PFC and standby modes. FIG. 5 shows the envelope of converter current during the operating interval superimposed on the input voltage waveform illustrating how the duration, $T_{x1}$, $T_{x2}$, of the operating intervals may be controlled. The power converter may operate over a range of power levels between zero power and a maximum rated power, $P_{max}$. As shown in FIG. 4, the operating interval increases as the operating power increases and vice versa. In some embodiments, illustrated by the dashed curve 257 in FIG. 4, the operating interval may approach, but never exceed, a maximum value of T1 (the characteristic period of the converter input voltage $V_{in}$); in other embodiments, as illustrated by the solid curve 259 in FIG. 4, the duration of the operating interval may be essentially equal to T1 for power levels above some pre-determined value $P_x$ and be controlled to be of shorter duration for power levels below $P_x$. FIG. 4 is illustrative only. In practice, the "transfer function" for a switching power supply system 100 may be based upon more than a single variable such as power. Rather, the length of an operating interval may be controlled as a function of a combination of factors, including, e.g., specific converter operating conditions (e.g., magnitude of input voltage; amount of power delivered) and the choice of power converter and controller topologies.

Referring to FIG. 5, a methodology for controlling the duration and phase angle of the operating interval for sinusoidal and other symmetrical input voltage waveshapes will be described. In FIG. 5, the dashed waveform 261 references a half-cycle of a rectified sinusoidal AC voltage source 140. Times Tz1 and Tz2 correspond to times which the AC source 140 crosses zero volts (the difference between Tz2 and Tz1 being equal to the characteristic period of the converter input voltage, T1). Although the dashed waveform in FIG. 5 represents a complete half-cycle of a sinusoidal wave implying ideal rectification (a rectification period equal to 100% of each half cycle of the sinusoidal input voltage), non-ideal rectifiers may reduce the rectification period to less than 100% of each half-cycle, e.g. 98% of the half-cycle, effectively reducing T1 and thus limiting the maximum available operating interval. Time, Tp, corresponds to the time of occurrence of the peak value of the AC source voltage. FIG. 5 shows the envelope of the input current $i_{in}(t)$ during a first operating interval of duration Tx1 at an operating power level P1 (solid outline), and during a second operating interval of duration Tx2 at an operating power level P1, where P1>P2 and Tx1>Tx2 (dashed outline). Note that the envelope of the input current $i_{in}(t)$ during the operating interval may be controlled to follow the waveform of the input voltage during the operating interval approximating PFC with operating intervals shorter than the rectification period.

As shown in FIG. 5, each illustrated operating interval begins after Tz1 and ends prior to Tz2. As power decreases the duration of the operating interval may become shorter; as power increases the duration of the operating interval may become longer. A controller according to the present disclosure therefore may set an upper limit, Tmax<T1, and a lower limit, Tmin<Tmax, on the length of the operating interval (FIG. 4). Thus, as shown in FIG. 5, as operating power decreases in a converter according to the present disclosure, the duration of an operating interval may be controlled to be less than T1 by controlling the times at which the operating interval begins and ends to occur closer in time to the time Tp.

The operating interval may represent a portion of the period T1 in which the switching power converter 110 converts power from the input for delivery to load 120. As described above, the switching power converter 110 may operate in a series of converter operating cycles in which the converter operating period may be, for example, 1% or less of the period T1 of the input voltage $V_{in}$. During the remaining portion of the period T1 outside the operating interval, the switching power converter 110 may refrain from converting power from the input for delivery to load 120.

Figure 6:
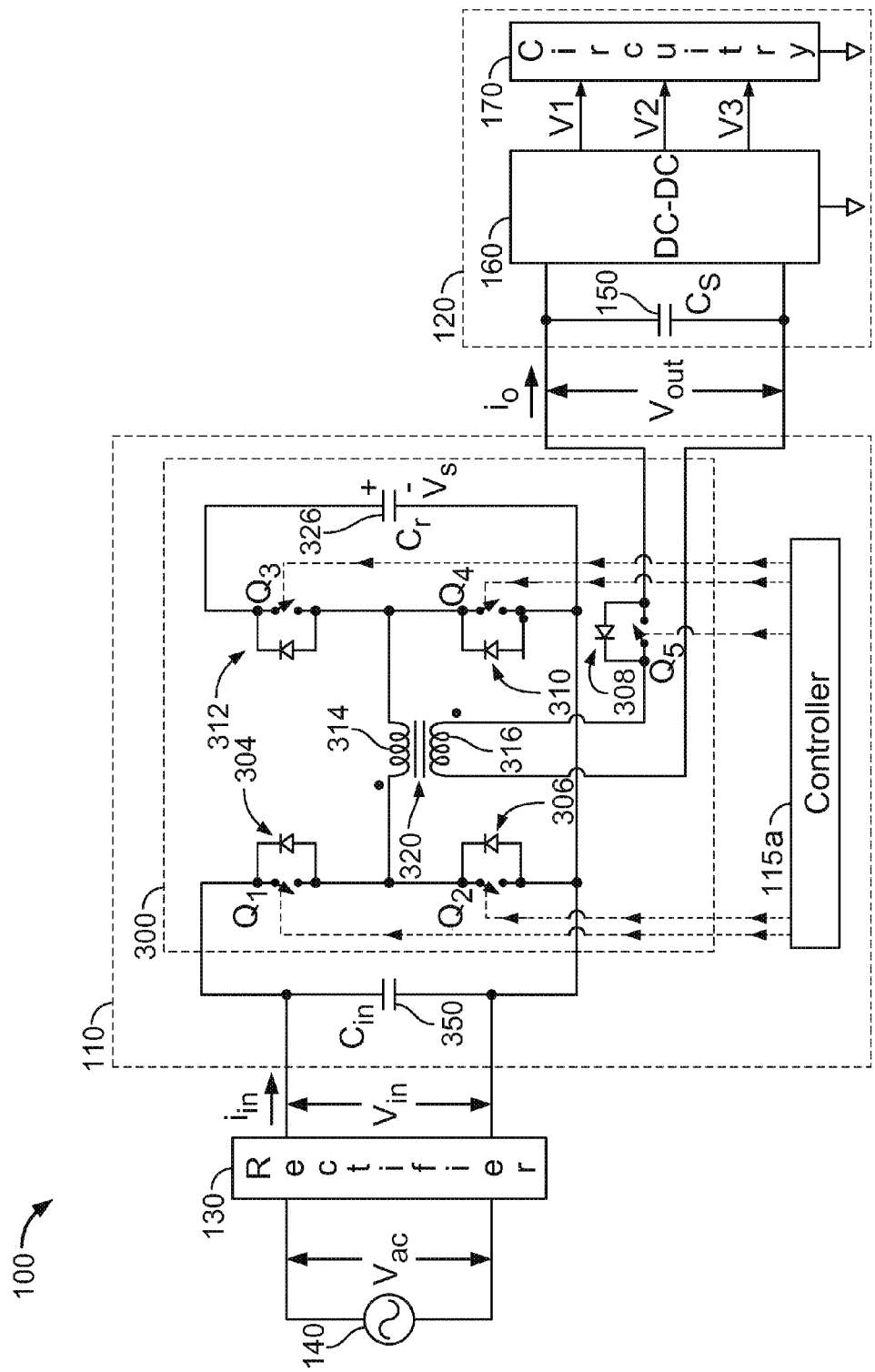
FIG. 6 shows an embodiment of an off-line switching power supply system comprising a double-clamped ZVS buck-boost converter.
Figure 7:
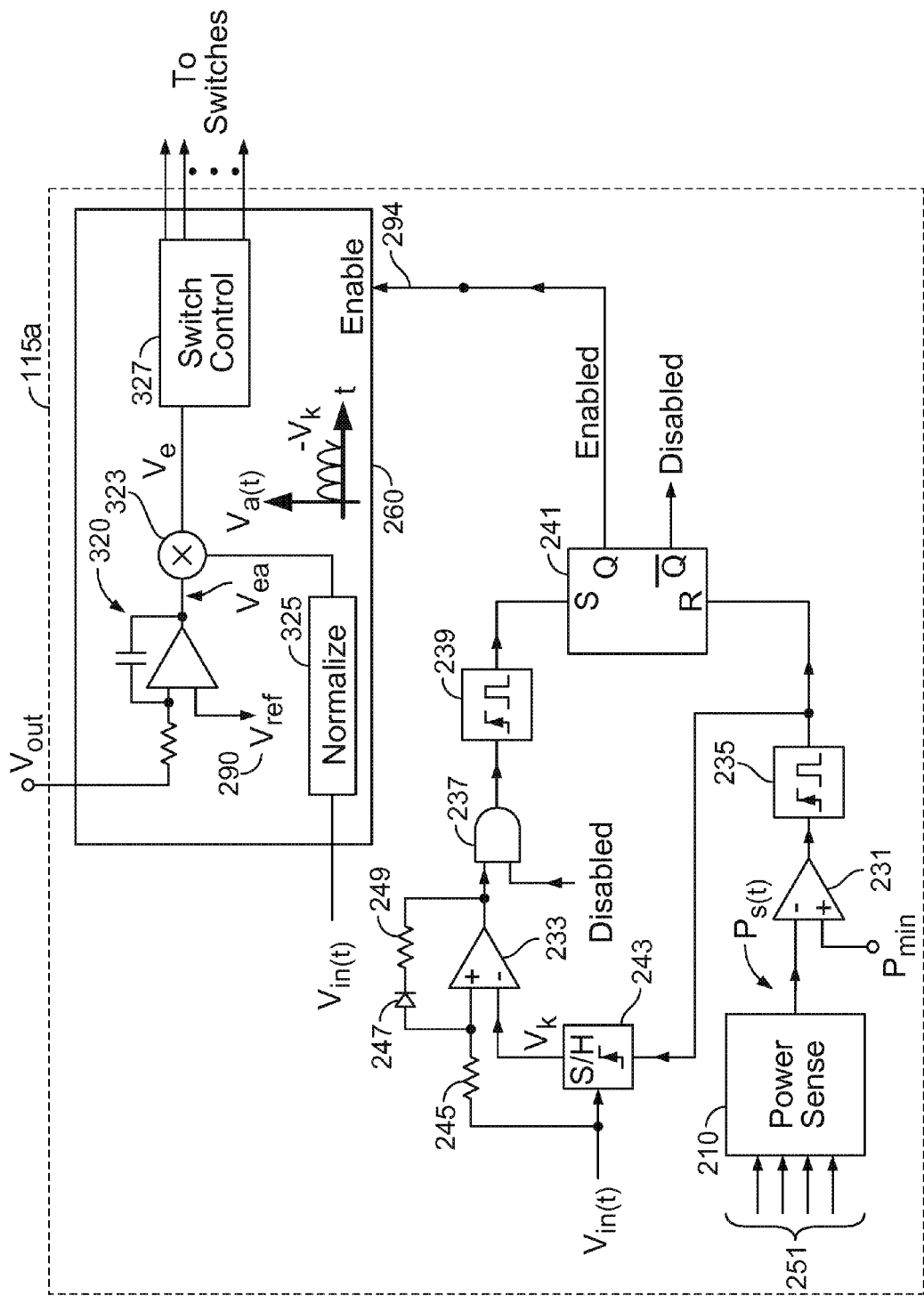
FIG. 7 shows a block diagram of a controller for use in the power supply system of FIG. 6.

FIG. 6 shows a schematic of a preferred embodiment of a converter 100 according to the present disclosure. In FIG. 6, the power supply system 100 comprises a switching power converter 110 and a double-clamped ZVS buck-boost converter 300 of the kind described in the Double-Clamped Patent. FIG. 7 shows a simplified block diagram of a controller 115a for controlling the operation of the converter 300 of FIG. 6. As discussed in the Double-Clamped Patent, the double-clamped ZVS buck-boost converter 300 may comprise a transformer 314, for providing isolation and voltage transformation; a clamp capacitor $C_R$ 326; and five switches, Q1-Q5 304, 306, 312, 310, 308 (in FIG. 6 each of the switches Q1-Q5 is shown as comprising an ideal switch in parallel with a diode; in practice these switches may be MOSFETs and the diodes may be intrinsic diodes). In operation, the controller 115a in the system of FIG. 6 controls the relative timing and durations of the ON-times of the switches Q1-Q5 as a means of maintaining the converter output voltage $V_{out}$ at some pre-determined value as well as performing input power factor correction. Operating details of the double-clamped ZVS buck-boost converter 300 are discussed in the Double-Clamped Patent. The switching power converter 110 of FIG. 6 also includes an input bypass and storage capacitor $C_{IN}$ 350 to provide a low impedance at the input of the converter 300. Although the double-clamped converter 300 of FIG. 6 is shown to have only one secondary 316 delivering power to one output, it is understood that a converter 300a may, as shown in the partial schematic in FIG. 10, comprise a plurality of secondary windings 316a-316n and corresponding switches Q5a-Q5n for delivering power to respective outputs 120a-120n.

As shown in FIG. 7, the controller 115a may comprise a power sensor circuit 210, first and second comparators 231, 233, positive edge-triggered pulse generators 235, 239, a set-reset flip-flop 241, AND gate 237, positive edge-triggered sample-and-hold 243 and a power factor corrector and switch controller 260. For the double-clamped converter 300 of FIG. 6, the PFC and switch controller 260 may be of the kind described in the Double-Clamped Patent. As shown in FIG. 7, the PFC and switch controller 260 comprises a switch control circuit 327; an integrating error amplifier circuit 320; a normalizer 325 and a multiplier 323. Normalizer 325 accepts the unipolar converter input voltage, $V_{in}$, and delivers an output, Vn, that has the same waveshape as $V_{in}$ but a fixed amplitude, Vk. In some embodiments the normalizer 325 may accept a waveform indicative of the waveform of the absolute value of the AC input source 140.

Whenever an enable input 294 to the PFC and switch controller 260 is true, the PFC and switch controller 260 will control the switches (e.g., switches Q1-Q5 304, 306, 312, 310, 308, FIG. 6) in the switching power converter 110 as a means of maintaining the voltage $V_{out}$ at a desired setpoint value (as indicated, e.g., by the reference voltage Vref 290, FIG. 7). When the enable input 294 is false, the switching power converter 110 will be disabled.

The power sense circuit 210 may be any of a wide variety of circuits for delivering a signal, Ps(t), indicative of the instantaneous magnitude of the converter input power, $P_{in}(t)=V_{in}(t) \cdot i_{in}(t)$. In FIG. 7 the power sense circuit 210 is shown receiving several inputs 251: these inputs may comprise, e.g., measurements indicative of the converter input voltage $V_{in}(t)$ and the converter input current $i_{in}(t)$. However, as discussed below, in a controller for use with certain types of power converters 300, such as, e.g., the Double-Clamped converter 300 of FIG. 6 or an isolated or non-isolated flyback converter, it may be possible to derive the signal Ps(t) from the output of error voltage amplifier 320.

In the controller of FIG. 7, the switch controller 327 may be configured to control the duration of the "energy storage phase" (as that term is defined in the Double-Clamped Patent; the duration of the energy storage phase is substantially equal to the length of time that Q1 and Q4 (FIG. 6) are simultaneously on) during each converter operating cycle to be proportional to the error voltage, Ve. A double-clamped converter controlled in this way may deliver an amount of energy during each converter operating cycle that is substantially proportional to the square of the duration of the energy storage phase. Thus, in a double-clamped converter the power delivered by the converter may be controlled to be substantially proportional to the square of the error voltage, Pout(t)=K·Ve². For the power factor corrected converter of FIGS. 6 and 7, in which the waveform of the converter input current, $i_{in}(t)$, is to be controlled to conform to the waveform of the converter input voltage, $V_{in}(t)$, the converter input power is equal to $Pin(t)=V_{in}(t) \cdot i_{in}(t)=V_{in}(t) \cdot (K \cdot V_{in}(t))=K \cdot V_{in}(t)^2$, where K is a constant. Since the converter power output (ignoring losses), Pout(t), is substantially equal to the converter input power, Pin(t), controlling an error voltage Ve to comprise a time-varying component that follows the waveform of the input voltage $V_{in}(t)$ will result in the converter being controlled to perform power factor correction.

In FIG. 7, multiplier 323 multiplies the output of integrating error amplifier circuit 320, Vea, and the normalized waveform signal, Vn(t), to produce an error voltage Ve(t) that has the waveform of $V_{in}(t)$ and an amplitude that is proportional to Ve. Integrating error amplifier circuit 320 compares the DC converter output voltage, $V_{out}$, to a reference voltage, Vref, indicative of a pre-determined setpoint value for $V_{out}$, and adjusts Vea to maintain $V_{out}$ at the setpoint value. In this way, the amplitude and waveform of Ve are controlled both to perform power factor correction and regulate the converter output voltage to be at the desired setpoint value. Because the square of the signal Ve(t) is proportional to the operating power of the converter, it may also be used (squared, scaled and offset as required) to generate the signal Ps(t).

An advantage of using a double-clamped converter 300 is that the voltage, Vr, across clamp capacitor $C_R$ 326 (FIG. 6) is substantially proportional to the converter output voltage $V_{out}$. Use of Vr to indicate $V_{out}$ may reduce overall converter cost and complexity by eliminating the need for isolation circuitry that might otherwise be needed to measure $V_{out}$, e.g. as described in Clarkin, Primary Side Sampled Feedback Control in Power Converters, U.S. patent application Ser. No. 11/601,890.

Figure 11:
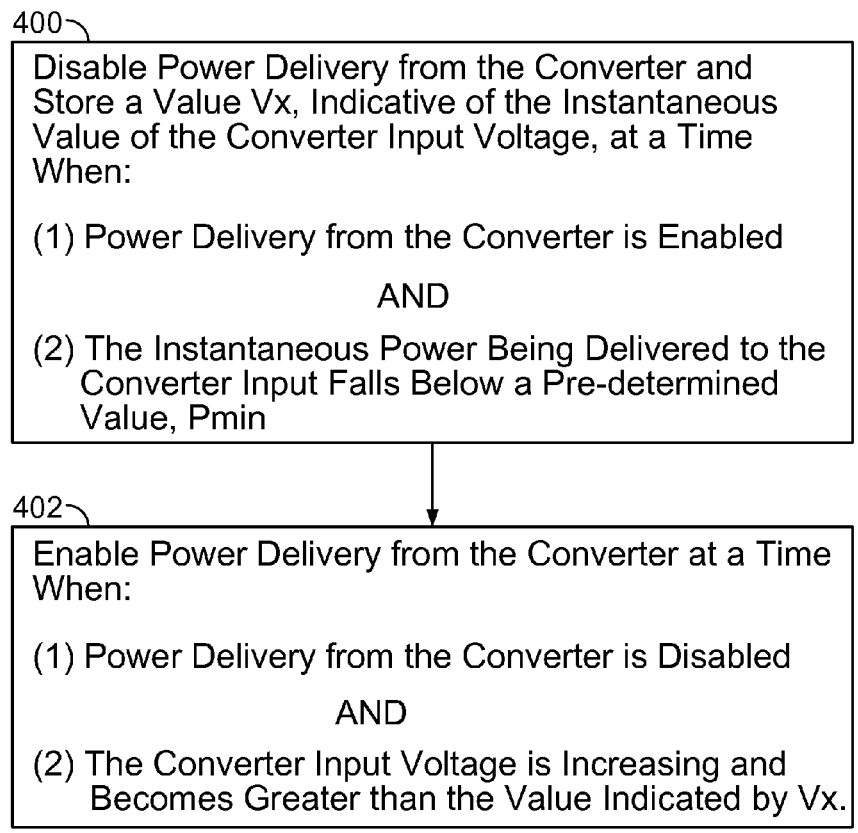
FIG. 11 shows a method for controlling the power supply system of FIG. 6.

The duration of the operating interval in the converter of FIGS. 6 and 7 may be controlled according to the following method:

1. With reference to FIG. 11, step 400: at a time (e.g., a time, $t_{dis}$) when the power delivery from the converter is enabled and the instantaneous power delivered to the converter input ($Pin(t)=V_{in}(t) \cdot i_{in}(t)$) falls below a pre-determined value, Pmin, disable power delivery from the converter and store a value, Vx, indicative of the value of the converter input voltage (e.g., indicative of $V_{in}(t_{dis})$);

2. With reference to FIG. 11, step 402: at a time (e.g., a time $t_{en}$) when power delivery from the converter is disabled and the input voltage is increasing and becomes greater than a value indicated by a threshold voltage Vx, enable the converter to deliver power.

Operation of the converter 100 of FIGS. 6 and 7, in accordance with the described control method, is described with reference to the steady-state waveforms of FIG. 8. In the description it is understood that use of the same symbols for both actual and measured signals is for ease of discussion. The measured signals may be scaled, level-shifted, filtered, or isolated by known means as needed. In FIG. 7, comparator 231 compares the signal Ps(t), indicative of the instantaneous magnitude of the converter input power, $P_{in}(t)$ (FIG. 8C), to a pre-determined value Pmin (Pmin may, for example, indicate a power value equal to 5% of the maximum rated power of the converter). When Ps(t) drops below Pmin, at time $t_{dis}$ (FIG. 8C), the output of comparator 231 goes high, triggering edge-triggered pulse generator 235. The rising edge of the output of pulse generator 235 resets flip-flop 241, causing the Enable signal 294 to go low (FIG. 8D) and a Disable signal to go high and disabling the converter 300 from delivering power. The rising edge of the output of pulse generator 235 also triggers edge-triggered sample-and-hold circuit 243 to store and output a value $V_x=V_{in}(t_{dis})=V_{inx}$ (FIGS. 7 and 8A). The value $V_x$ represents a threshold voltage for triggering the Enable signal 294. Comparator 233 compares $V_{in}(t)$ to Vx and, at time $t_{en}$, when $V_{in}(t)$ has increased above $V_{inx}$ (FIG. 8A), the output of comparator 233 goes high, triggering edge-triggered pulse generator 239 via AND gate 237. The rising edge of the output of pulse generator 239 sets flip-flop 241, causing the Enable signal 294 to go high (FIG. 8D) and the Disable signal to go low, enabling the converter 300 to deliver power. By the process described, the duration of the operating interval of the converter 300 ($T_x$, FIG. 8C) may be controlled as a function of load power, i.e. to increase with increasing load power and decrease with decreasing load power. At relatively high operating power levels the duration of the operating interval may be close in value to T1 and the phase angle may be adjusted to center the operating interval about the peak of the voltage waveform. Furthermore, while the converter 300 is enabled, the converter input current $i_{in}(t)$ (FIG. 8B) may be power factor controlled to follow the waveform of the input voltage $V_{in}(t)$, as previously described. The term "full PFC" may appropriately describe operation for operating intervals approximating T1 in duration. However, operation for shorter operating intervals (i.e. at lower power levels) may more appropriately be called "partial PFC" because, although the current envelope essentially matches the input voltage waveshape during the operating interval, it is essentially flat (i.e. zero) outside of the operating interval.

In order for the operating interval to start at the appropriate time ($t_{en}$, FIG. 8A) it is necessary that $V_{in}$ drop below Vinx at some time prior to $t_{en}$. Owing to the presence of the rectifier 130 and input capacitance 350, however, the rate of decline of the voltage $V_{in}$ during the time that the converter is disabled may be very small, or substantially zero, as illustrated in FIG. 8A. Furthermore, transfer of energy from AC source inductance (not shown) to the converter input capacitance 350 after the converter is disabled may actually cause the converter input voltage to increase following $t_{dis}$. Some or all of these factors may prevent the converter input voltage from declining below Vinx prior to the next occurrence of the AC source rising to equal Vinx, thereby interfering with the described operation of the converter.

One way to ensure that the input voltage declines during the period that the converter is disabled is to provide a dissipative load. Use of a dissipative load, however, conflicts with the objective of minimizing wasted energy. Where the input waveform is known, e.g. for use with AC mains which use 50 or 60 Hz sine waves, a phased locked loop may be used to synchronize an internal timing and amplitude reference for the input waveform, e.g. to avoid the input capacitance issue during light loads. The synchronized internal reference may then be used to turn the converter on and off at the appropriate times. Another solution allows the converter to continue to operate in a modified disabled mode processing small amounts of power for delivery to the converter bias circuitry during the disable periods. In the modified disable mode, the main output switch may be disabled, decoupling the converter from the load. The bias circuitry which may be coupled to a secondary winding may continue to operate thus allowing power to be directed to the converter bias circuitry. To reduce the amount of power processed during each converter operating cycle, the reference voltage to the controller may be reduced, e.g. to a level below the clamp capacitor voltage, to force the controller to adjust the switch ON and OFF times to reduce the amount of power being processed in the converter. The modified disable mode thus draws power from the input capacitance to draw down the input voltage and supplies it to the converter bias circuitry which is necessary to operate the converter and thus avoids the waste associated with a passive approach.

Figure 10:
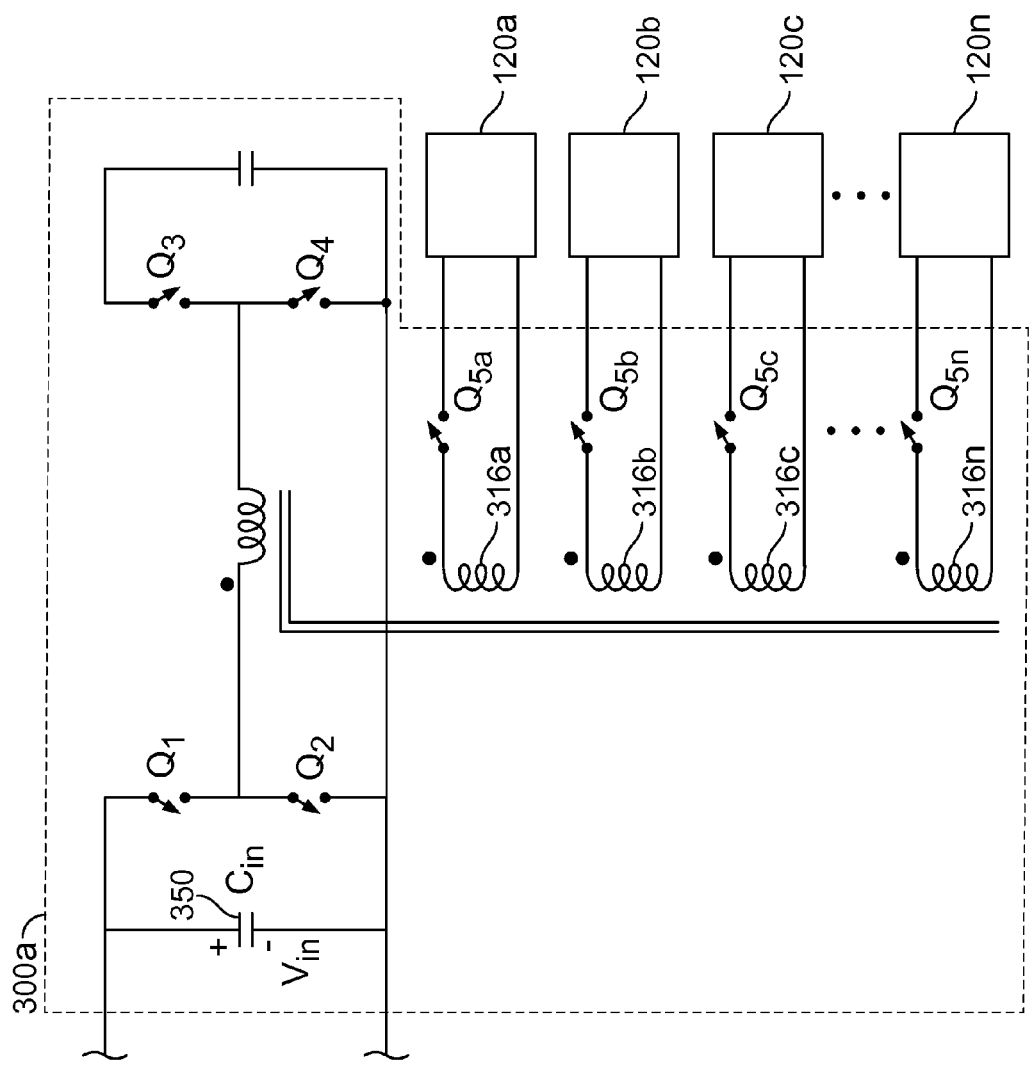
FIG. 10 shows a double-clamped ZVS buck-boost power converter comprising several outputs.

FIG. 10 shows the converter 300a similar to converter 300 (FIG. 6) but having a multiplicity of outputs 120a-120n. The main output 120a may deliver power to the main load as described above, relatively low power bias output 120b may be used to deliver power to essential supervisory and control circuitry (e.g., bias power for converter 300 and/or other circuitry), and outputs 120c-120n supply power to other non-essential loads. Switches Q5a and Q5c-Q5n may be held off during the time that the converter is disabled, i.e. during the modified disable mode, preventing power transfer to their respective outputs, whereas switches Q1-Q4 and switch Q5b may continue to be controlled to provide bias power via secondary 316b as a means of "bleeding" energy out of the input capacitance 350 and reducing $V_{in}$. A benefit of this approach is that substantially no energy is wasted (compared to a dissipative approach, and ignoring the small amount of switching loss associated with operating the switches) because operating the bias output(s) during the time when the rest of the outputs are disabled alters only the time periods during which energy is transferred to the bias outputs and does not alter the total amount of bias power delivered.

Waveforms for the power supply system 100 of FIGS. 6 and 7, at four different power levels, are shown in FIGS. 9A through 9D. FIG. 9A shows the average load power delivered by the switching power converter 110 during selected time intervals. FIG. 9B shows the corresponding converter input voltage waveform during each respective interval, all having the same peak voltage Vinp. FIG. 9C shows the corresponding instantaneous power, $Pin(t)=V_{in}(t) \cdot i_{in}(t)$ drawn by the converter. And FIG. 9D shows the corresponding envelope of the pulsating input current, $i_{in}$, of the switching power converter 110 during each respective interval. The time period T1, corresponding to one-half cycle of the AC source 140, is the characteristic period of the unipolar time-varying input voltage $V_{in}$.

Between times to and tb, the switching power converter 110 is delivering a relatively large amount of average power, P1, (FIG. 9A). Because P1>>Pmin (the instantaneous value of power below which the converter 110 is disabled, FIG. 9C), the operating interval during which the switching power converter 110 is enabled, Tx1, comprises almost the full characteristic period, T1 (FIG. 9D). Between times to and tb, the peak amplitude of the envelope of the input current $i_{in}$ is shown to be I1.

Between times tc and td, the average power delivered by the switching power converter 110 is reduced to P2<P1, (FIG. 9A). Because P2 is less than P1, but still relatively large compared to Pmin, the operating interval, Tx2, during which the switching power converter 110 is enabled is shorter than Tx1 but still comprises a relatively large portion of the full characteristic period, T1 (FIG. 9D). Between times tc and td, the peak amplitude of the envelope of the input current $i_{in}$ is reduced to I2<I1.

Between times te and tf, the average power delivered by the switching power converter 110 is reduced to P3<P2<P1, (FIG. 9A) and, as illustrated in FIG. 9D, the operating interval, Tx3, during which the switching power converter 110 is enabled has been further reduced to Tx3<Tx2<Tx1. Between times te and tf, the peak amplitude of the envelope of the input current $i_{in}$ is also reduced to I3<I2<I1.

Between times tg and th, the average power delivered by the switching power converter 110 is further reduced to P4<P3<P2<P1, (FIG. 9A) and, as illustrated in FIG. 9D, the operating interval, Tx4, during which the switching power converter 110 is enabled has been further reduced to Tx4<Tx3<Tx2<Tx1. Between times tg and th, the peak amplitude of the envelope of the input current is also reduced to I4<I3<I2<I1.

Figure 13:
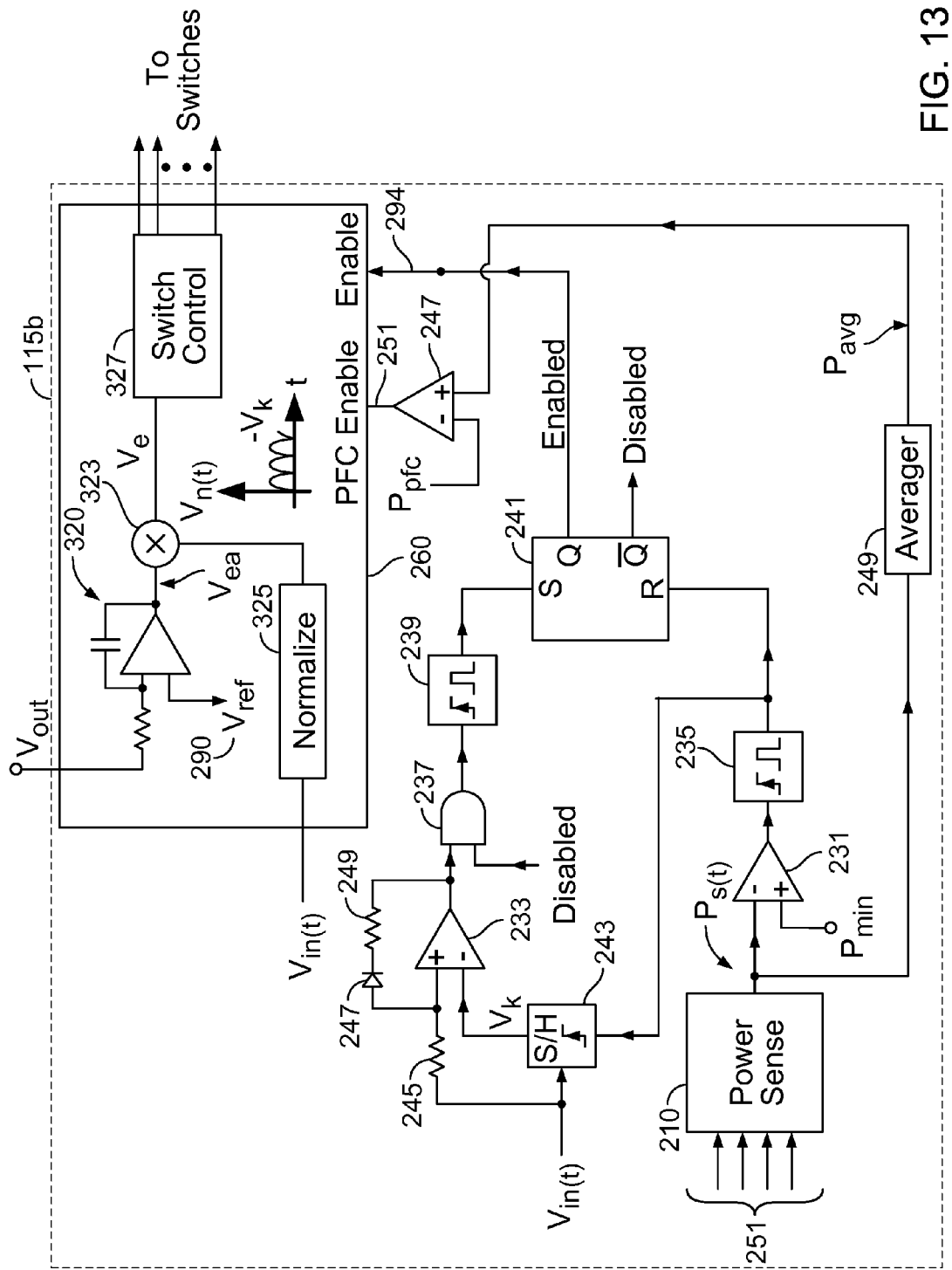
FIG. 13 shows another block diagram of a controller for use in the power supply system of FIG. 6.

Regulatory requirements may demand that a power converter perform power factor correction when the input power to the converter is above a pre-determined threshold level. Therefore, in some embodiments, in which a power converter may be required to operate over a range of power levels, a controller according to the present disclosure may be configured to perform power factor correction when the converter operating power (i.e., the average value of Ps(t)) is above a pre-determined level, Ppfc, and may be disabled from performing power factor correction when the converter operating power is below Ppfc. FIG. 13, for example, shows a controller 115b that is a modified version of the controller 115a of FIG. 7. In FIG. 13, the controller 115b additionally comprises an averager 249 that delivers an output signal Pavg that is the average value of the instantaneous power Ps(t), and a comparator 247 that compares Pavg to a pre-determined threshold average power value, Ppfc. When Pavg is greater than Ppfc, the PFC Enable input 251 of switch controller 260 is brought high, enabling the switch controller 260 to perform power factor correction; when Pavg is less than Ppfc, the PFC Enable input 251 of switch controller 260 is brought low, disabling the switch controller 260 from performing power factor correction. When power factor correction is disabled, the controller 260 may control $V_{out}$ by any of a variety of known control methods.

Figure 14:
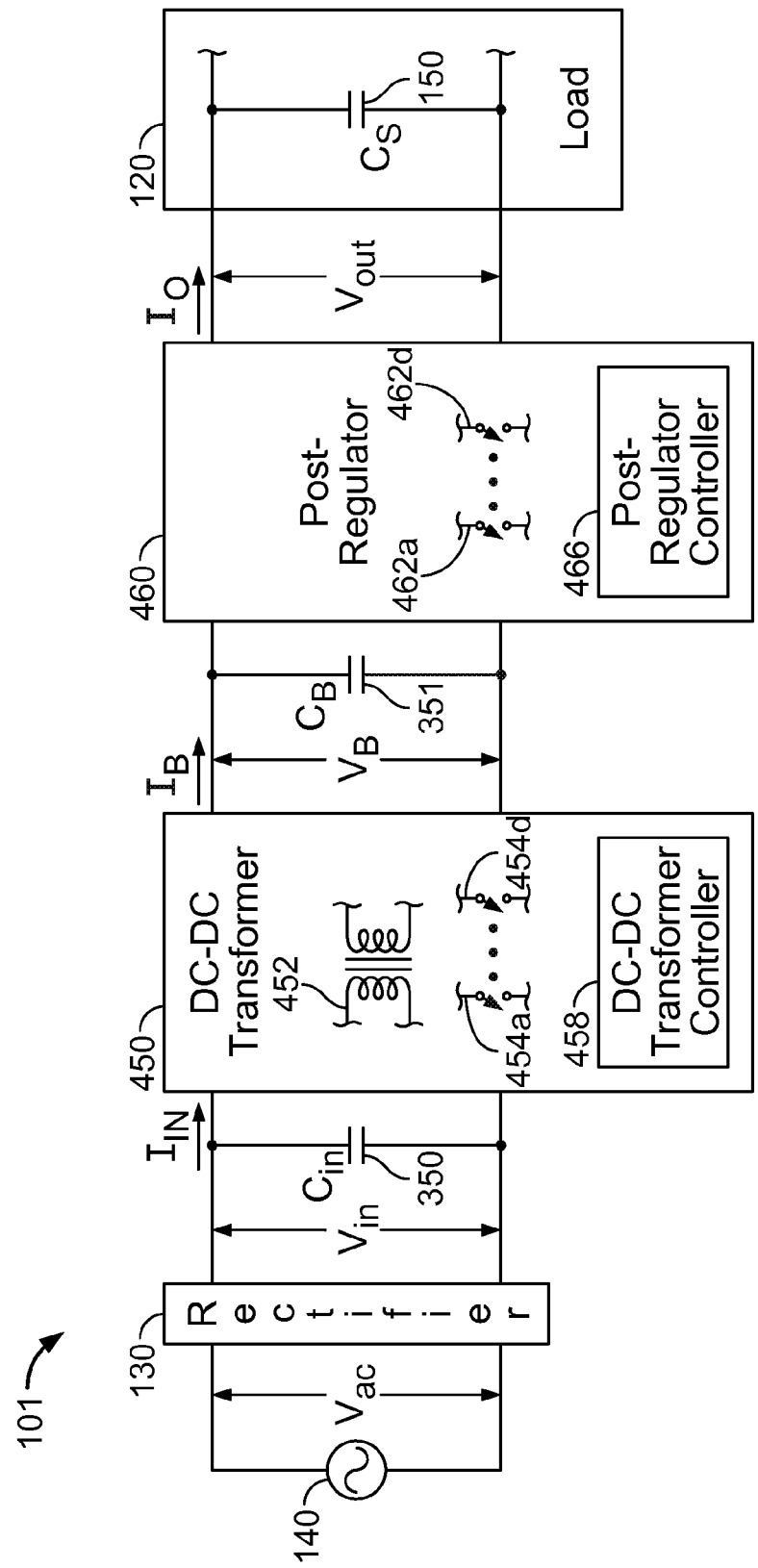
FIG. 14 shows an embodiment of an off-line switching power conversion system comprising a DC transformer and a post-regulator.

FIG. 14 shows a schematic of another embodiment of a power supply system 101 including a DC transformer 450 cascaded with a post-regulator 460 feeding a load 120, which include a topology similar to the converters described in Universal AC Adapter, Vinciarelli, U.S. Pat. Nos. 7,548,441 and 7,940,540 (assigned to VLT, Inc., Sunnyvale, Calif. and incorporated here in their entirety by reference). The remaining elements in the converter 101 of FIG. 14 are essentially the same as those with like reference numbers and described previously with respect to the circuit of FIG. 6. Input bypass capacitors, $C_{in}$ 350 and $C_B$ 351 may be provided, either internally or externally, at the input of the DC transformer 450 and post-regulator 460, respectively, to provide low impedance bypass path at the switching frequency of each respective switching converter.

As used herein, the term "DC transformer" means a switching power converter that delivers a DC output voltage that is a fixed fraction of the voltage at its input. As shown in FIG. 14, the output of DC transformer 450 may be connected to a bus and, accordingly, the bus voltage, $V_B$, is a fixed fraction of the input voltage, $V_{in}$. Preferably, the DC transformer also provides isolation between its input and its output providing the functions of isolation and voltage transformation. FIG. 14 shows the DC transformer 450 including a power transformer 452 with galvanically isolated primary and secondary windings, one or more switches (e.g., switches 454a . . . 454d) to drive the primary winding(s) and preferably to synchronously rectify the secondary signals, and a controller, e.g. DC transformer controller 458, for controlling the switches.

Figure 15:
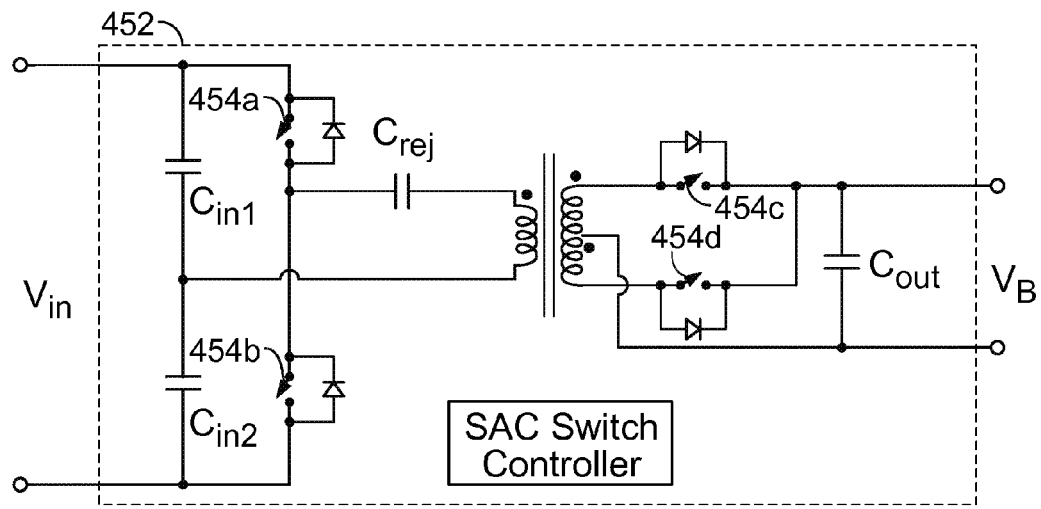
FIG. 15 shows a schematic of an embodiment of a Sine-Amplitude Converter.

Although, the DC transformer 450 may be configured using any known DC transformer circuits, such as hard or soft switching bus converters, preferably the DC transformer incorporates some of the following features (in combination according to the particular application). For example, the DC transformer may, as shown in FIG. 15, use a Sine Amplitude Converter ("SAC") topology of the kind described in Factorized Power Architecture with Point of Load Sine Amplitude Converters, Vinciarelli, U.S. Pat. No. 6,930,893 and Point of Load Sine Amplitude Converters and Methods, Vinciarelli, U.S. Pat. No. 7,145,786, (both assigned to VLT, Inc., Sunnyvale, Calif. and incorporated in their entirety here by reference) (hereinafter the "SAC Patents"). Arrays of individual DC transformers or one or more DC transformers having a plurality of cells linked by a common transformer, e.g. as an integrated array, may have inputs and/or outputs configured dynamically to reduce component stress or reducing the range of variation of $V_B$ as $V_{in}$ varies, or statically configured for example in a series arrangement to divide the input voltage, as described in the following patents all of which are assigned to VLT, Inc. of Sunnyvale, Calif. and incorporated here in their entirety by reference: Adaptively Configured Voltage Transformation Module Array, Vinciarelli, U.S. Pat. Nos. 7,170,764 and 7,420,825 (adaptive DC transformer module and integrated arrays); Adaptively Configured and Auto-ranging Voltage Transformation Module Arrays, Vinciarelli, U.S. Pat. Nos. 7,212,419 and 7,423,892 (Adaptive DC transformer Module and Integrated Arrays); Adaptively Configured and Auto-ranging Power Converter Arrays, Vinciarelli, U.S. Pat. No. 7,782,639 (stacked cell converters).

Figure 16:
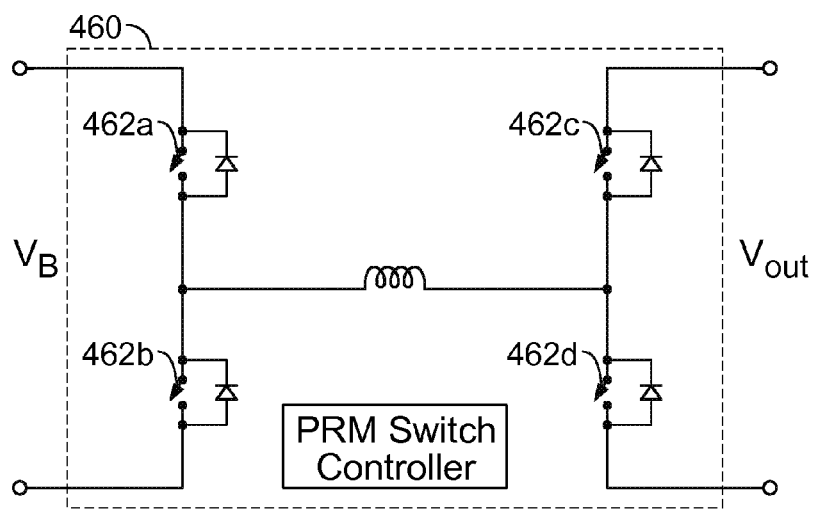
FIG. 16 shows a schematic of an embodiment of a buck-boost converter.

Post-regulator 460, having its input connected to the bus, may convert power received from the DC transformer and deliver a controlled output voltage, $V_{out}$, to the load 120. The post-regulator 460 as shown may include a controller, e.g. post-regulator controller 466, to operate one or more switches, e.g. switches 462a-462d, in the post-regulator controlling any of the output voltage, $V_{out}$, for voltage regulation, output current, $I_o$, for current regulation or limiting, and input current, e.g. for power factor correction in accordance with the desired control strategy. The post-regulator may be implemented using any of a variety of known switching regulator topologies. However as shown in FIG. 16, the post-regulator may preferably be implemented, e.g. as buck-boost converter 466 shown in FIG. 16, using the buck-boost topologies described in Buck-Boost DC-DC Switching Power Conversion, Vinciarelli, U.S. Pat. Nos. 6,788,033 and 7,154,250 (assigned to VLT, Inc. of Sunnyvale, Calif. and incorporated here in their entirety).

With reference to FIG. 14, the power supply system 101 may be operated as follows. With a unipolar pulsating voltage, $V_{in}$, (e.g. as shown in FIG. 1) at its input, the DC transformer 450 will, when enabled, generate a pulsating bus voltage, $V_B$, that is a scaled version of the voltage $V_{in}$. DC transformer 450 and post-regulator 460 may each preferably operate with a respective converter operating period that is small relative to the characteristic period, T1, of the pulsating input voltage, $V_{in}$, and preferably less than 1% of T1. Bulk energy storage and filtering over a time period corresponding to the characteristic period of the pulsating input voltage, T1, may be provided at the output of post-regulator 460, e.g. using bulk storage capacitor Cs 150 (FIG. 14). Input filter capacitor, Cin 350, and bus filter capacitor, $C_B$ 351, may each therefore be relatively small and store relatively little energy sufficient to provide smoothing at the relatively high operating frequency of each converter. Where power factor correction is implemented, the post-regulator may force its input current to follow the wave shape of the input voltage.

The DC transformer 450 and the post-regulator 460 may be enabled to convert power during each operating interval and disabled at times between the operating intervals. Referring to FIGS. 4, 5, 14 and 17, at load levels that are less than a predetermined threshold, the controller 458 (FIGS. 14, 17) may limit operation of the DC transformer 450 to an operating interval (FIG. 5) which may be selectively controlled to range from a predetermined minimum duration such as zero percent (0%) of T1 to a predetermined maximum duration such as 100% of T1 in accordance with an algorithm. The algorithm may increase the duration of the operating interval from a minimum to a maximum as the average power delivered by the DC transformer. One such algorithm is graphically depicted in FIG. 4.

Figure 17:
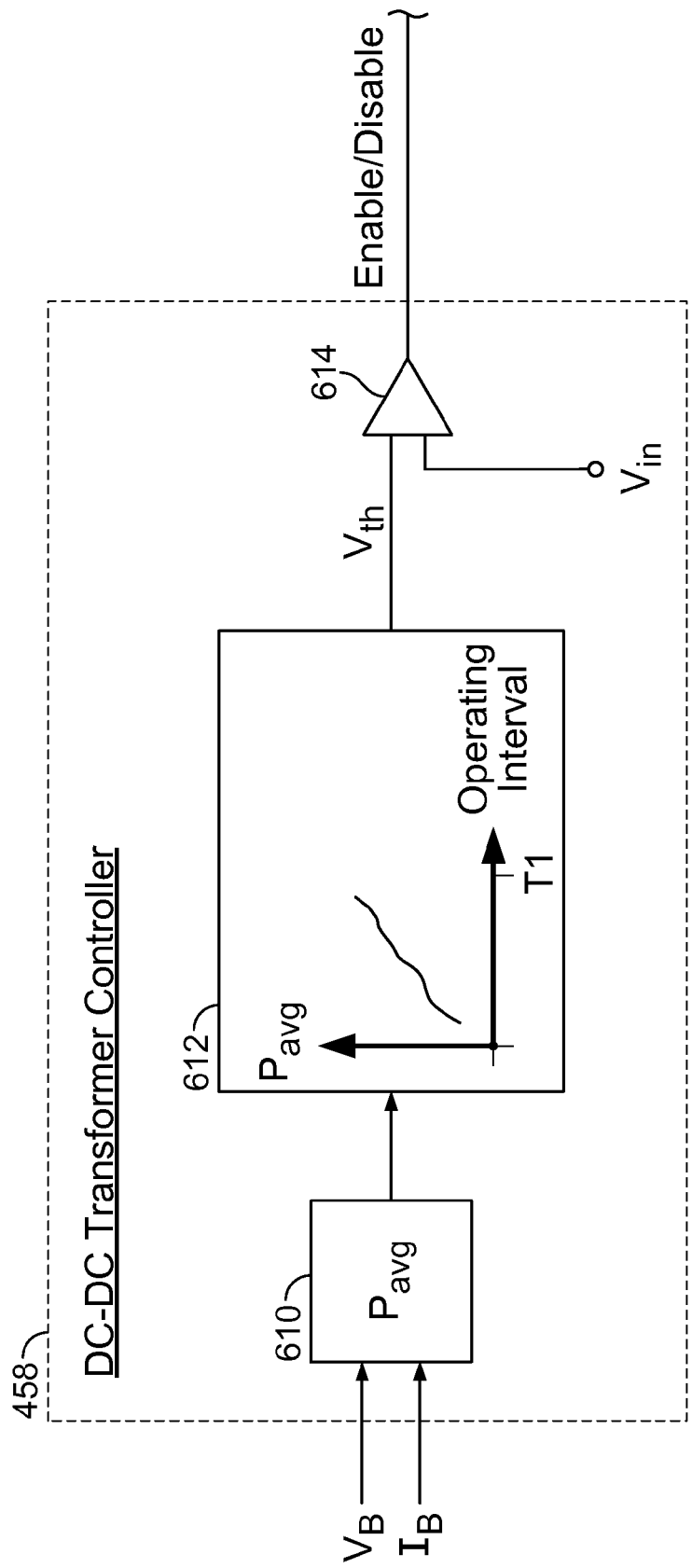
FIG. 17 shows a block diagram of a portion of a controller for use in a DC transformer.

The functional block diagram of FIG. 17 shows the controller 458 including a functional block 610 for determining the average power delivered by DC transformer 450 using signals representative of the DC transformer output voltage $V_B$ and current $I_B$. It will be understood that other signals may be used to estimate the power throughput of the DC transformer and further that the instantaneous power may be used instead of the average power. An algorithm functional block 612 is shown producing a threshold voltage, $V_{TH}$, as an output based upon the input signal representative of the power and using an internal algorithm, which in the case of this example maps the average power to operating interval duration. A comparator function 614 as shown uses the threshold voltage, $V_{TH}$, as an input against which it compares the instantaneous input voltage, $V_{in}$, and produces an enable/disable signal based upon the comparison. For example, the DC transformer 450 may be enabled at times when $V_{in}$ is above $V_{TH}$ and disabled at times when $V_{in}$ is not above $V_{TH}$. Some or all of the functions (FIG. 17) of the controller 458 may be implemented using a microprocessor, microcontroller, digital signal processor, or other circuitry. For example, the algorithm may be coded in software or stored in tables, or both. In alternate embodiments the circuitry may use a measurement of the average input power to the DC transformer instead of the average output power.

Alternatively, the duration of the operating interval may be controlled, e.g. by the controller 458, in accordance with the control methodology described previously with reference to FIG. 11 using a measure of the instantaneous power. Accordingly, at a time when the power delivery from the DC transformer is enabled and the instantaneous power delivered to the DC transformer input ($P_{in}(t) = V_{in}(t) \cdot i_{in}(t)$) falls below a pre-determined value, Pmin, the controller 458 may disable the DC transformer and store a value, Vx, indicative of the value of the input voltage (e.g., indicative of $V_{in}(t_{dis})$) as shown in Step 400 (FIG. 11). At a time when power delivery from the DC transformer is disabled and the input voltage is increasing and becomes greater than a value indicated by a threshold voltage, Vx (stored in step 400), the controller may enable the DC transformer 450 to deliver power as shown in Step 402 (FIG. 11). Such a controller may, for example, comprise circuitry similar to that shown in FIG. 7 (of course replacing the switch control circuitry 260 specific to the regulating converter of the previous example with control circuitry suitable for a DC transformer). Using one of the above methods, the operating interval of the DC transformer may be controlled, supplying truncated pulses to the bus during light load operation.

Figure 19:
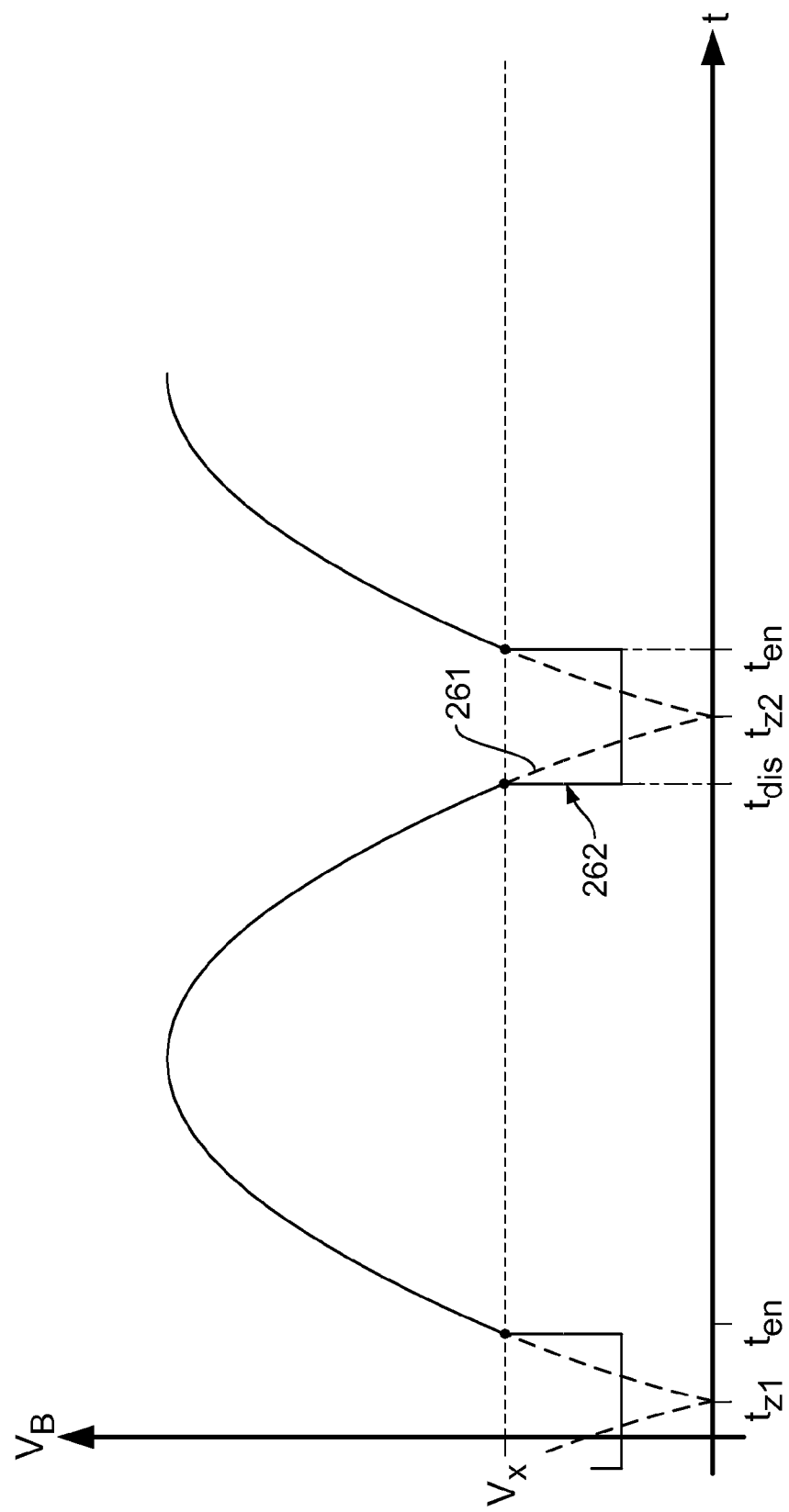
FIG. 19 shows a waveform for the power supply system of FIG. 14.

Referring to FIG. 19, an example of a truncated pulse waveform is shown for the bus voltage, $V_B$, in a power system 101 of the kind shown in FIG. 14. Times Tz1 and Tz2 correspond to times at which the AC source 140 crosses zero volts, as described earlier with reference to FIG. 5. Time $t_{dis}$ (FIG. 19) corresponds to the time at which the input voltage, $V_{in}$, has decreased to the value, $V_{TH}$, and the DC transformer 450 has been disabled by its controller 458, as described earlier. At time, $t_{dis}$, the bus voltage has decreased to a value $V_B(t_{dis}) = Vx$, where the ratio of Vx to $V_{TH}$ is determined by the voltage transformation ratio, $K = V_B/V_{in} = V_x/V_{TH}$, of the DC transformer. Because post-regulator 460 may not yet have been disabled at time, $t_{dis}$, the bus voltage, $V_B$, may exhibit a sudden change in slope, e.g. in the region 262 in FIG. 19, as energy is withdrawn from the relatively small bus capacitor 351. The post-regulator controller 460 may determine the end of each operating interval by sensing such a change in the bus voltage corresponding to a stop in the power throughput of the DC transformer, i.e., it is disabled.

Figure 18:
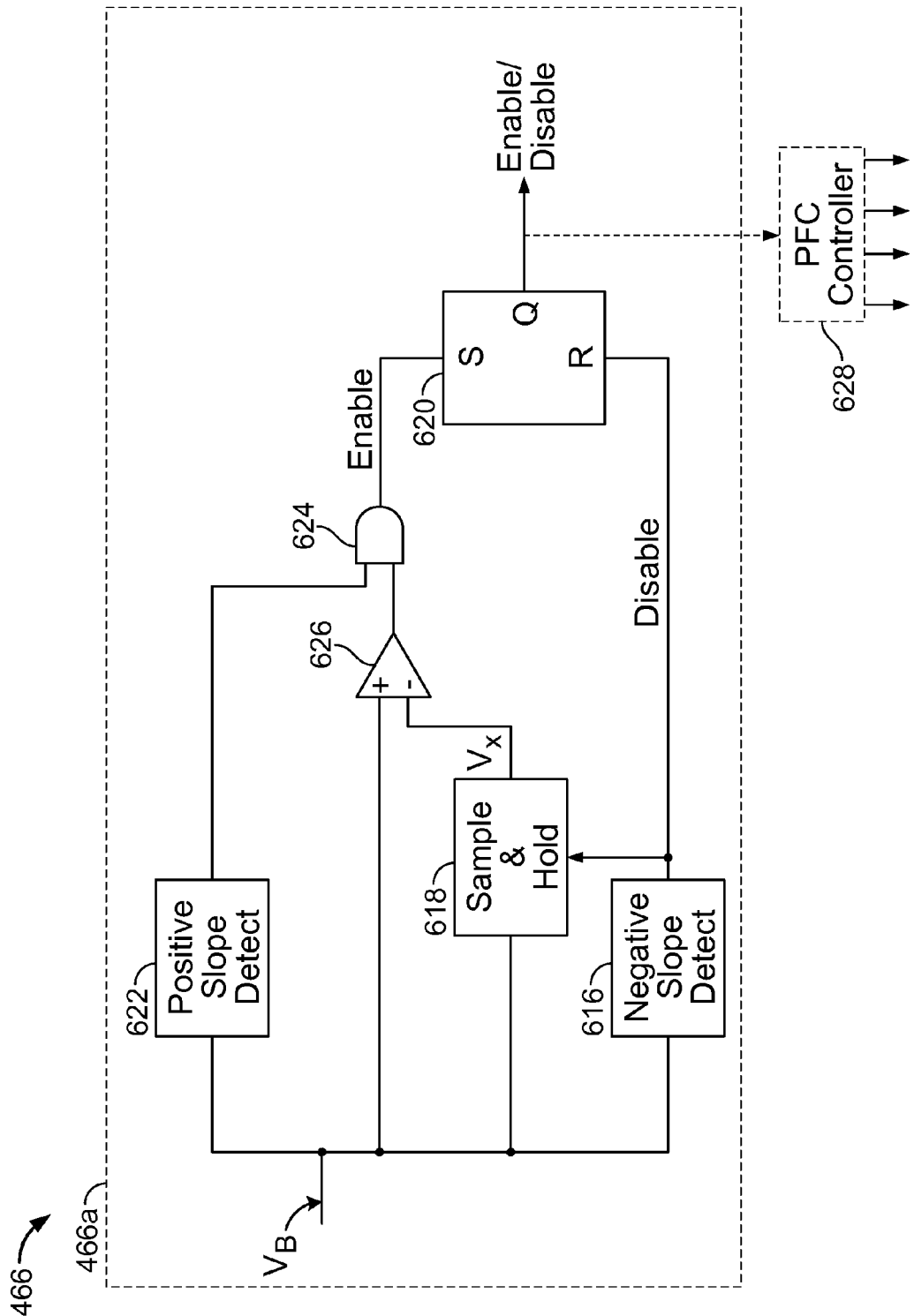
FIG. 18 shows a block diagram of a portion of a controller for use in a post-regulator.

One way of implementing operating interval control of the post regulator 460 is shown in the block diagram of FIG. 18. The operating interval control circuitry 466A, which may be implemented as part of the post-regulator controller 466 as shown, may be used to enable and disable the post-regulator 460 (FIG. 14) to restrict its power throughput operation to time intervals during the operating intervals. As shown, the operating interval control circuitry 466A may include a negative slope detector function 616, a positive slope detector function 622, a sample and hold function 618, a comparator function 626, a gating function 624, and flip-flop function 620. The negative slope detector 616 may detect a sharp increase in the magnitude of the negative slope of $V_B$, e.g. at time $t_{dis}$, which may be used to latch the flip-flop 620 into a reset state, disabling the post-regulator 460, and stopping, or substantially reducing, the power drawn by the post-regulator. The negative slope detector may also be used to cause the Sample-and-Hold 618 to store a sample of the bus voltage at time $t_{dis}$, $V_B(t_{dis}) = Vx$.

At time $t_{en}$ (FIG. 19), the input voltage has increased to be equal to $V_{TH}$ and the DC transformer has again been enabled by controller 458 to deliver power to the bus. As a result, the bus voltage, $V_B$, will rise with a relatively sharp positive slope to a magnitude substantially equal to $Vx = K^* V_{TH}$. The positive slope detector 622 (FIG. 18) may sense the positive slope enabling gate 624 allowing signals from comparator 626 to propagate through the gate to flip-flop 620. Comparator 626 compares the value of the bus voltage $V_B$ to the previously stored value $V_x$. When the comparator 626 detects that $V_B$ has risen to, or just above, the level of Vx, it may send an enable signal to latch the flip-flop 620 into a set state, enabling post-regulator 460 to once again convert power from the bus $V_B$. In this manner, the DC transformer and post-regulator are essentially synchronized in the system 101 of FIG. 14 with the DC transformer setting the operating interval based upon its power throughput and the post-regulator following by sensing the beginning and end of the operating intervals, both converters restricting their own power throughput to occur during the operating intervals and remaining disabled otherwise.

Figure 20:
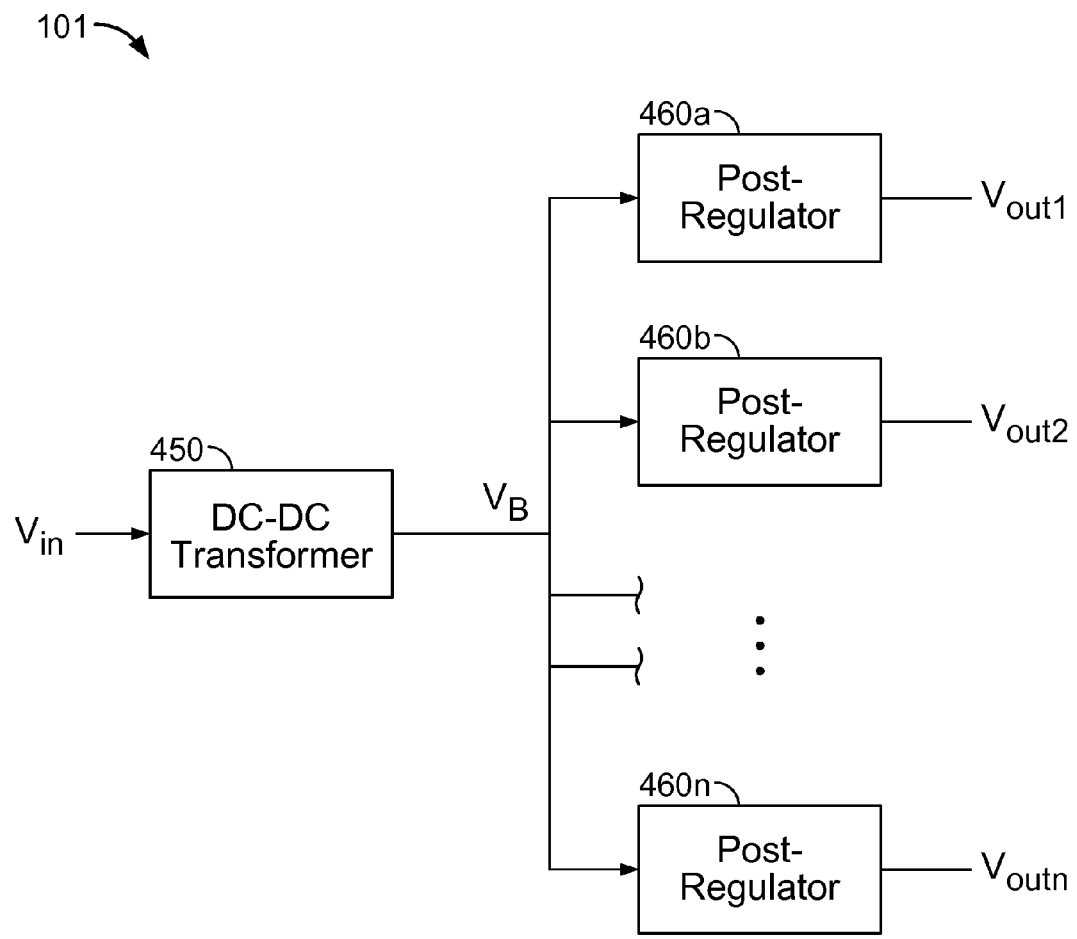
FIG. 20 shows an embodiment of an off-line switching power conversion system comprising a DC transformer and a plurality of post-regulators.

As shown in FIG. 20, the system 101 may comprise a plurality of post-regulators 460a, 460b . . . 460n. Some or all of the post-regulators may include a post-regulator controller 466 of the kind described above in connection with FIG. 18. In such a system, all of the post-regulators may be enabled in synchronism with the DC transformer.

As shown in FIG. 18, the post-regulator controller 466 may also comprise a Power-Factor Correcting controller 628 to control the switches in the post-regulator so that the waveform of the current drawn at the input of the post-regulator is substantially the same as the waveform of the bus voltage, $V_B$. The PFC controller 628 may be enabled whenever the post-regulator is enabled, allowing the current drawn from the input source 140 to correspond to the voltage waveform of the input source. In a system with a plurality of power-factor-correcting post-regulators, synchronization of the operation of all post-regulators with the operation of the DC transformer may enable the entire system 101 to appear as a single power-factor-corrected load on the AC input source 140.

Figure 21:
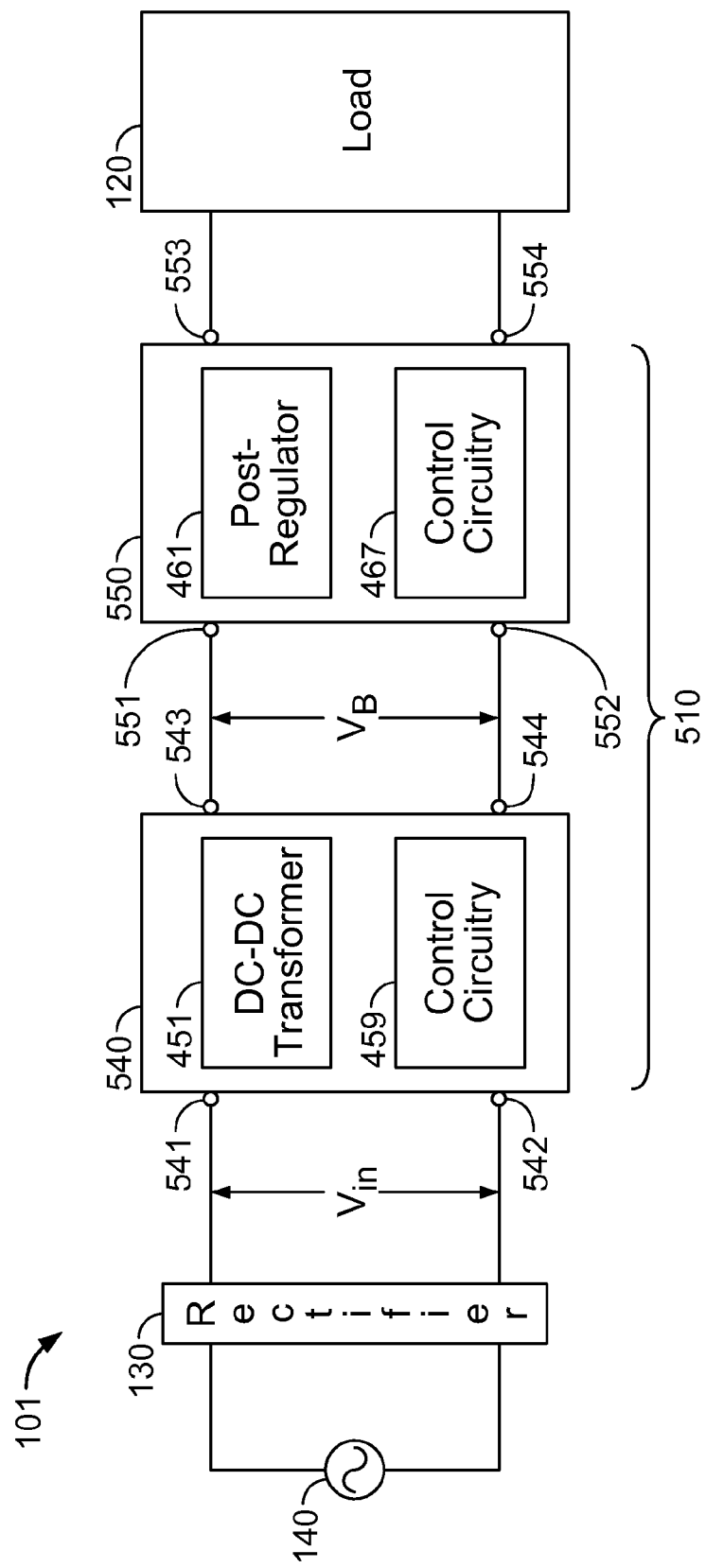
FIG. 21 shows a system of the kind shown in FIG. 14 comprising modular components.

FIG. 21 shows an embodiment of the system 101 of FIG. 14 in which the converter 510 includes a self-contained DC transformer device 540 and a self-contained post-regulator device 550. The DC transformer device 540, comprising DC transformer circuitry 451 and related control circuitry 459, receives input voltage, $V_{in}$, at input terminals 541, 542 and delivers output voltage, $V_B$, at output terminals 543, 544. The post-regulator device 550, comprising post-regulator circuitry 461 and related control circuitry 467, receives the voltage, $V_B$, at input terminals 551, 552 and delivers output voltage, $V_{out}$, at output power at output terminals 553, 554. In some embodiments the DC transformer device 540 may also incorporate rectifier 130 allowing the AC input source 140 to be directly connected to input terminals 541, 542. A benefit of the system of FIG. 21 is that one or more post-regulator devices may be connected to a DC transformer device 540, as illustrated in FIG. 20, and one or more of the post-regulators may be located at separate locations from the DC transformer device and from each other. For example, the DC transformer device may be provided as a universal AC adapter for supplying power to a plurality of electronic devices, such as a laptop computer, cell phone, tablet computer, and camera, etc. each of which may incorporate a respective post-regulator, and some or all of which may be powered simultaneously by the universal adapter. As a further example, a universal AC adapter module ("ACM") utilizing a DC transformer may power a multiplicity of LED lighting modules incorporating respective post-regulators through an isolated, distributed, unipolar, low voltage bus pulsating at the frequency of the rectified AC line.

A method for operating a system 101 of the kind that comprises a DC transformer that receives an input voltage from an input source characterized by a series of unipolar pulses having a pulse duration (e.g., as shown in FIGS. 14, 20 and 21) may generally include monitoring the power used by the system, e.g. by monitoring the power throughput of the DC transformer, and establishing an operating interval for the system. The duration of the operating interval and its temporal position relative to the unipolar pulse waveform may be adjusted as a function of the power. The system may be enabled to process power during the operating interval and prevented from processing power outside of the operating interval. One or more post-regulators may receive power from the DC transformer to provide a controlled voltage or current to one or more loads. The post-regulators may be configured to sense the start and/or end of the operating intervals (e.g. in lieu of signaling from the DC transformer) and restrict power processing through the post regulators to occur during the operating intervals, e.g. by enabling power processing when it senses the beginning of the operating interval and disabling power processing when it senses the end of the operating interval. The post-regulator(s) may optionally draw a current at its input, when enabled, having a waveform that is essentially the same as the waveform of the voltage at its input.

The duration and position of the operating interval may be set by generating a threshold voltage as a function of the power and enabling the system to process power from the input source when the input source voltage is above the threshold voltage and disabling the DC transformer when the input source voltage is below the threshold voltage. An alternative method of establishing the duration and position of the operating interval relative to the input wave shape may include ending the current operating interval when the instantaneous power used by the system falls below a pre-defined power threshold, saving the input voltage at the time the operating interval is ended, and beginning the next operating interval when the input voltage rises above the saved input voltage.

The post-regulator(s) may sense beginning and end of the operating intervals set by the DC transformer by sensing the slope of the voltage delivered by the DC transformer to the input of the post-regulator(s). The post-regulator may optionally set a shorter operating interval for its own power processing by terminating its power processing for the current operating interval when the power throughput of the post-regulator falls below a threshold, saving the voltage at the input of the post-regulator, Vx, and resuming its power processing when the voltage at the input of the post-regulator rises above the saved voltage, Vx.

Although the system has been described using a measure of average or instantaneous, input or output power as criterion for defining the duration of the operating intervals, it should be understood that equivalent measurements or other parameters may also be used, such as, e.g., measurement of converter currents, or other parameters reliably related to power delivery.

It may be preferable to essentially center the operating interval about the time of occurrence of the peak value of the AC source voltage (e.g., time Tp, FIGS. 5 and 8A). In some actual embodiments the operating interval may be substantially symmetrically centered in time around Tp at relatively high operating power levels, but may diverge from being symmetrically centered as the operating power level is reduced. In actual embodiments, the degree to which the operating interval may diverge from being symmetrically centered around Tp may depend upon one or more factors, including, e.g., the amount of power being delivered by the converter, the amount of converter input capacitance (Cin 350, FIG. 2) and the control strategy employed. However, the duration of operating intervals under steady-state operating conditions may be controlled to be less than the characteristic period, T1, by controlling the times at which the operating intervals begin and end (e.g., times $t_{en}$ and $t_{dis}$, respectively, FIG. 8A) to occur closer in time to the time Tp.

The elements of the controller 115a of FIG. 7 or 115b of FIG. 13 are exemplary and may be embodied in a variety of ways. Some or all of the controller may be implemented as hardware or as software code and/or logical instructions that are processed by a digital processor or other means, or a combination of both. The logical processes may run concurrently or sequentially with respect to each other or with respect to other processes, such as measurement processes, voltage regulation processes and related calculations. Controllers may be implemented in mixed-signal circuitry; in circuitry comprising mixed-signal circuitry comprising a microprocessor and/or digital processor core; or in circuitry comprising a combination of mixed-signal circuitry and a separate microprocessor or digital signal processor. The controller may be implemented as an integrated circuit or a hybrid device. There may also be additional functions associated with the controller. Pre-determined values, such as the durations of the maximum and minimum operating intervals and the reference voltage, may be stored in read-only or re-programmable non-volatile memory.

Figure 12:
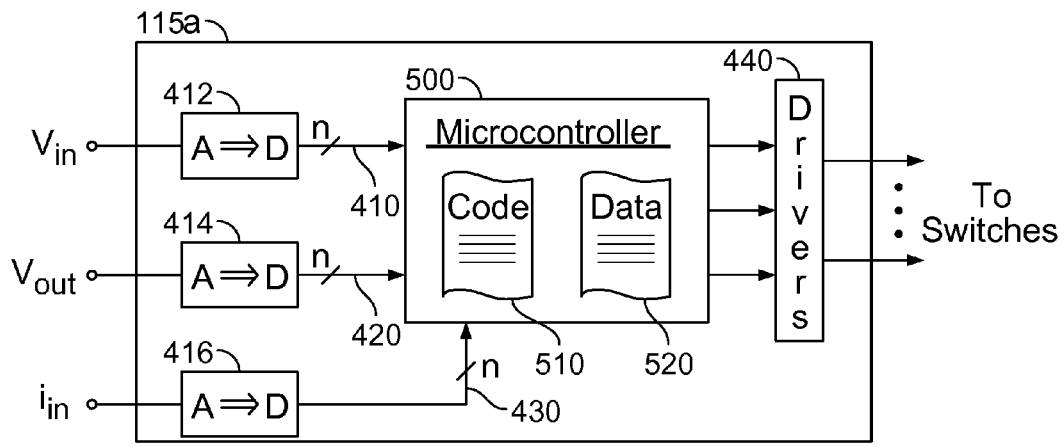
FIG. 12 shows a digital embodiment of a switching power supply controller.

In preferred embodiments, the controller 115a may, as shown in FIG. 12, comprise a microcontroller 500 (e.g., a type C8051F330 microcontroller, as described in a datasheet entitled C8051F330/1/2/3/4/5 Mixed Signal ISP Flash MCU Family, Rev. 1.5, 1/06, manufactured by Silicon Labs, Inc., 4635 Boston Lane, Austin, Tex., USA); one or more analog-to-digital converters 412, 414, 416 for converting analog inputs into n-bit digital signals 410, 420, 430; and drivers 440 for, e.g., driving switches Q1-Q5n (FIG. 10). Controller functions, such as the integrating error amplifier circuit 320; normalizer 325; multiplier 323; comparators 231, 233 and switch control circuitry 327 and other circuitry and algorithms associated with PFC and switch controller 260 may, e.g., be implemented as software algorithms and may be stored as software code (e.g., in code memory 510, FIG. 12); real-time data and values of pre-defined constants may be stored in one or more forms of data memory (e.g., data memory 520, FIG. 12).

The hold-up techniques described in Energy Storage and Hold-Up Method and Apparatus for High Density Power Conversion, Vinciarelli, U.S. Pat. Nos. 7,408,795 and 7,616, 465 (assigned to VLT, Inc., Sunnyvale, Calif. and incorporated here in their entirety by reference) may be used to provide hold-up storage for the power converter systems of FIGS. 14, 20, and 21, preferably being switched in the event of a fault with the input source.

A number of embodiments of the invention have been described. Nevertheless, it will be understood that various modifications may be made without departing from the spirit and scope of the invention. For example, although the operation described above shows an operating interval occurring during each unipolar pulse, 0-T1, T1-T2, T2-T3, etc., at very low power levels, the controller may skip one or more unipolar pulses, between operating intervals, inhibiting operating intervals during the skipped unipolar pulses, e.g. enabling operating intervals for every second or third unipolar pulse. Furthermore, one or more of the loads 120a, 120b, 120c, 120n in FIG. 10 may comprises a DC-DC converter such as converter 160 shown in FIG. 2. Accordingly, other embodiments are within the scope of the following claims.

What is claimed is:

1. Apparatus comprising:
    an unipolar input for receiving a pulsating unipolar input voltage characterized by a series of unipolar pulses at a characteristic frequency, each unipolar pulse being characterized by a pulse waveform and a pulse duration,
    a first switching power converter for converting power received from the unipolar input for delivery to a first output, the first switching power converter comprising one or more switches, and
    a first controller for operating the one or more switches in a series of converter operating cycles,
    wherein the converter operating cycles comprise a duration defining a converter operating period,
    wherein the converter operating period is 1% or less of the pulse duration,
    wherein the first power converter is adapted to convert power for delivery to the first output during an operating interval, the operating interval comprising a selected portion of the pulse duration, and to refrain from delivering power to the first output during the remainder of the pulse duration, the waveform of the voltage delivered by the first power converter to the first output during the operating interval being substantially the same as the waveform of the pulsating input voltage during the operating interval; and to vary the duration of the operating interval as a function of the magnitude of the power converted by the first switching power converter.

2. The apparatus of claim 1 wherein the first power converter further comprises a transformer and provides galvanic isolation between the unipolar input and the first output.

3. The apparatus of claim 2 wherein the first power converter delivers an output voltage to the first output that is a fixed fraction of the voltage received at the unipolar input.

4. The apparatus of claim 1 wherein the first switching power converter is adapted to terminate a present operating interval when a representation of the power being processed by the first switching power converter satisfies a predetermined condition.

5. The apparatus of claim 1 wherein the first switching power converter is adapted to initiate a new operating interval when the input voltage rises to a level representative of the voltage at which the previous operating interval was terminated.

6. The apparatus of claim 3 further comprising a distribution bus connected to receive and transmit power from the first output.

7. The apparatus of claim 6 further comprising one or more second power conversion stages connected to receive power from the first output via the distribution bus and deliver a respective controlled output to a respective load.

8. The apparatus of claim 7 wherein the second power conversion stages are adapted to convert power from the distribution bus essentially during the operating interval and to essentially refrain from converting power from the distribution at other times.

9. The apparatus of claim 7 wherein the one or more second power conversion stages comprise a plurality of second power conversion stages.

10. The apparatus of claim 8 wherein the second power conversion stages are further adapted to sense the beginning and end of each operating interval.

11. The apparatus of claim 3 further comprising a rectifier circuit having a rectifier input for receiving AC power and a rectifier output for delivering a unipolar voltage to the unipolar input.

12. The apparatus of claim 11 wherein the first switching power converter is further adapted to switch the fixed fraction between a first value for a first predetermined input voltage range and a second value for a second predetermined input voltage range.

13. Apparatus comprising:
    an input port for receiving power from a unipolar pulsed power source which delivers power in a series of pulses which occur a maximum repetition rate, the maximum repetition rate defining a minimum repetition period and the duration of each pulse defining an operating interval during which the unipolar pulsed power source is adapted to deliver power to the input port and outside of which the unipolar pulsed power source is adapted to refrain from delivering power to the input port; and
    a switching power converter comprising one or more switches and a controller for operating the one or more switches in a series of converter operating cycles, the duration of which defines a converter operating period that is 1% or less of the minimum repetition period;
    the switching power converter being adapted to convert power received from the input port for delivery to a load via an output during the operating interval and to essentially refrain from converting power during other times.

14. The apparatus of claim 13 wherein the power converter is further adapted to convert power for delivery to the load for a period shorter than the operating interval.

15. The apparatus of claim 13 wherein the power converter is adapted to deliver a controlled output to the load.

16. The apparatus of claim 15 wherein the power converter is further adapted to adjust an envelope of current drawn during the operating interval by the power converter from the unipolar input to approximate a waveform of pulse voltage during the operating interval.

17. The apparatus of claim 16 wherein the envelope of current and the waveform of pulse voltage are substantially sinusoidal during the operating interval.

18. The apparatus of claim 13 wherein the power converter stops converting power in response to a predetermined voltage change at the unipolar input indicating the end of an operating interval.

19. The apparatus of claim 13 wherein the power converter starts converting power in response to a predetermined voltage change at the unipolar input indicating the beginning of an operating interval.

20. The apparatus of claim 19 wherein the power converter starts converting power when a voltage the unipolar input is rising and reaches a threshold determined by the end of a previous operating interval.

21. Apparatus comprising:
an unipolar input for receiving a pulsating unipolar input voltage characterized by a series of unipolar pulses at a characteristic frequency, each unipolar pulse being characterized by a pulse waveform and a pulse duration,
a first switching power converter for converting power received from the unipolar input for delivery to a power distribution bus, the first switching power converter comprising:
one or more switches, and
a first controller for operating the said one or more switches in a series of converter operating cycles, each converter operating cycle characterized by a first converter operating period, the duration of the first converter operating period being 1% or less of the pulse duration,
wherein the first power converter is adapted to convert power for delivery to the power distribution bus during an operating interval, the operating interval comprising a selected portion of the pulse duration, and to refrain from delivering power to the power distribution bus during the remainder of the pulse duration, the waveform of the voltage delivered by the first power converter to the distribution bus during the operating interval being substantially the same as the waveform of the pulsating input voltage during the operating interval, the controller controlling the duration of the operating interval as a function of the magnitude of the power converted by the first switching power converter; and
one or more second switching power conversion stages each comprising:
an input port connected to receive power from the power distribution bus, and
one or more switches and a respective controller adapted to operate the one or more switches in a series of converter operating cycles, each converter operating cycle being characterized by a converter operating period, the duration of which is 1% or less of the pulse duration,
wherein the one or more second switching power conversion stages are adapted to convert power received from the input port for delivery to a respective load via a respective output at a respective output voltage during the operating interval and to essentially refrain from converting power during other times.

22. The apparatus of claim 21 wherein the one or more second power conversion stages are further adapted to adjust an envelope of current drawn during the operating interval from the input port to approximate the pulse waveform during the operating interval.

23. The apparatus of claim 22 wherein the envelope of current and the pulse waveform are substantially sinusoidal.

24. The apparatus of claim 21 wherein the one or more second power conversion stages comprise a plurality of second power conversion stages.

25. The apparatus of claim 21 wherein the first switching power converter is further adapted to control the position of the start and end times of the operating interval relative to the start and end times of the pulse waveform.

26. The apparatus of claim 21 wherein the one or more second power conversion stages sense the end of each operating interval by sensing and storing a magnitude, Vx, of the voltage across the power distribution bus at the end of each operating interval, and sensing the beginning of each operating interval by sensing when the voltage across the power distribution bus is increasing and passes above the voltage Vx.

27. The apparatus of claim 21 wherein the one or more second power conversion stages stop converting power in response to a predetermined voltage change at the input port indicating the end of an operating interval.

28. The apparatus of claim 21 wherein the one or more second power conversion stages start converting power in response to a predetermined voltage change at the input port indicating the beginning of an operating interval.

29. The apparatus of claim 28 wherein the one or more second power conversion stages start converting power when a voltage at the input port is rising and reaches a threshold determined by the end of a previous operating interval.

30. The apparatus of claim 21 wherein the first power converter further comprises a transformer and provides galvanic isolation between the unipolar input and the power distribution bus.

31. The apparatus of claim 30 wherein the first power converter delivers an output voltage to the power distribution bus that is a fixed fraction of the voltage received at the unipolar input.

32. The apparatus of claim 21 wherein the first switching power converter is adapted to terminate a present operating interval when a representation of the power being processed by the first switching power converter satisfies a predetermined condition.

33. The apparatus of claim 21 wherein the first switching power converter is adapted to initiate a new operating interval when the input voltage rises to a level representative of the voltage at which the previous operating interval was terminated.

34. Apparatus comprising:
an unipolar input for receiving a pulsating unipolar input voltage characterized by a series of unipolar pulses, the pulses being characterized by a pulse waveform, a pulse duration, and a characteristic frequency,
a first DC-DC switching power converter for converting power received from the unipolar input for delivery to a first load via a first output, the first DC-DC switching power converter comprising one or more switches, and
a controller for operating the one or more switches in a series of converter operating cycles each having a duration that is 1% or less of the pulse duration,
wherein the first power converter is adapted to convert power via the first output for delivery to the first load during an operating interval, the operating interval comprising a selected portion of the pulse duration, and to refrain from converting power via the first output for delivery to the first load during the remainder of the pulse duration; and to vary the duration of the operating interval as a function of the magnitude of the power converted by the first DC-DC switching power converter.

35. A method comprising:
receiving at an input, a pulsating unipolar input voltage characterized by a series of unipolar pulses, the pulses being characterized by a pulse voltage-waveform, a pulse duration, and a characteristic frequency,
converting, in a first DC to DC power conversion stage, power received from the pulsating unipolar input in a series of converter operating cycles, each having a duration that is 1% or less of the pulse duration, for delivery to a first load connected to a first output, enabling the converting via the first output for delivery to the first load during an operating interval comprising a selected portion of the pulse duration, disabling the converting via the first output for delivery to the first load during the remainder of the pulse duration;

varying the duration of the operating interval as a function of the magnitude of the power converted by the first DC-DC power conversion stage.

36. Apparatus comprising:

an input for receiving an input voltage having a characteristic frequency, a characteristic period, and a wave shape that corresponds to an ideal waveform, a switching power converter for converting power received from the input for delivery to a first output, the first switching power converter comprising one or more switches, and a controller for operating the one or more switches in a series of converter operating cycles, wherein the converter operating cycles comprise a duration defining a converter operating period, wherein the converter operating period is 1% or less of the characteristic period, wherein the controller includes an internal reference representing the ideal waveform and is further adapted to control a low frequency envelope of current drawn from the input by the power converter based upon the internal reference.

37. The apparatus of claim 36 wherein the ideal waveform is sinusoidal.

38. The apparatus of claim 36 wherein the internal reference representing the ideal waveform is stored in memory.

39. The apparatus of claim 36 wherein the controller is further adapted to synchronize the low frequency envelope of current with the wave shape of the input voltage.

40. The apparatus of claim 39 wherein the controller further comprises an internal timing reference including a phase locked loop for synchronizing the low frequency envelope of current with the input voltage.

41. The apparatus of claim 36 wherein the input comprises a unipolar input and the input voltage is a pulsating unipolar input voltage characterized by a series of unipolar pulses.

* * * * *

UNITED STATES PATENT AND TRADEMARK OFFICE
CERTIFICATE OF CORRECTION

| | | |
|---|---|---|
| PATENT NO. | : 9,087,656 B1 | Page 1 of 1 |
| APPLICATION NO. | : 13/526165 | |
| DATED | : July 21, 2015 | |
| INVENTOR(S) | : Vinciarelli | |

It is certified that error appears in the above-identified patent and that said Letters Patent is hereby corrected as shown below:

In the specification

Col. 16, line 47, Delete "I2<I1." and insert -- I2<I1. --, therefor.

Signed and Sealed this
Twenty-second Day of December, 2015

Michelle K. Lee
*Director of the United States Patent and Trademark Office*